United States Patent
Kang et al.

(10) Patent No.: US 12,452,451 B2
(45) Date of Patent: Oct. 21, 2025

(54) INTRA BLOCK COPY-BASED ENCODING/DECODING METHOD AND DEVICE, AND BITSTREAM STORAGE MEDIUM

(71) Applicant: Electronics and Telecommunications Research Institute, Daejeon (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/626,271

(22) Filed: Apr. 3, 2024

(65) Prior Publication Data

US 2024/0259593 A1    Aug. 1, 2024

Related U.S. Application Data

(63) Continuation of application No. 17/438,333, filed as application No. PCT/KR2020/003383 on Mar. 11, 2020, now Pat. No. 11,985,348.

(30) Foreign Application Priority Data

Mar. 11, 2019 (KR) .......................... 10-2019-0027805
Mar. 14, 2019 (KR) .......................... 10-2019-0029182
(Continued)

(51) Int. Cl.
H04N 19/593    (2014.01)
H04N 19/105    (2014.01)
(Continued)

(52) U.S. Cl.
CPC ......... *H04N 19/593* (2014.11); *H04N 19/105* (2014.11); *H04N 19/119* (2014.11);
(Continued)

(58) Field of Classification Search
CPC .... H04N 19/105; H04N 19/11; H04N 19/119; H04N 19/12; H04N 19/132;
(Continued)

(56) References Cited

U.S. PATENT DOCUMENTS 9,877,043 B2    1/2018  He et al.
2016/0198190 A1  7/2016  Budagavi
(Continued)

FOREIGN PATENT DOCUMENTS

CN    108712651 A    10/2018
KR    100772576 B1   11/2007
(Continued)

OTHER PUBLICATIONS

Zuo, Xuguang et al., "Intra block copy for intra-frame coding," Joint Video Experts Team (JVET) of ITU-T SG 16 WP 3 and ISO/IEC JTC 1/SC 29/WG 11. Apr. 2018. doc: JVET-J0042-v3.
(Continued)

*Primary Examiner* — Md N Haque
(74) *Attorney, Agent, or Firm* — BROADVIEW IP LAW, PC

(57) ABSTRACT

An image encoding/decoding method and apparatus are disclosed. The image decoding method includes acquiring prediction mode information of a current block from a bitstream, deriving a prediction mode of the current block using the prediction mode information of the current block, acquiring information indicating whether a residual signal of a transform block for the current block is present based on at least one of information on partitioning of the current block or the prediction mode of the current block, and
(Continued)

reconstructing the current block based on the information indicating whether the residual signal of the transform block is present.

9 Claims, 23 Drawing Sheets

(30) Foreign Application Priority Data

Jun. 18, 2019 (KR) .................. 10-2019-0072465
Jun. 19, 2019 (KR) .................. 10-2019-0073120

(51) Int. Cl.
*H04N 19/119* (2014.01)
*H04N 19/12* (2014.01)
*H04N 19/132* (2014.01)
*H04N 19/159* (2014.01)
*H04N 19/169* (2014.01)
*H04N 19/176* (2014.01)
*H04N 19/186* (2014.01)
*H04N 19/423* (2014.01)
*H04N 19/503* (2014.01)

(52) U.S. Cl.
CPC ........... *H04N 19/12* (2014.11); *H04N 19/132* (2014.11); *H04N 19/159* (2014.11); *H04N 19/176* (2014.11); *H04N 19/186* (2014.11); *H04N 19/1883* (2014.11); *H04N 19/423* (2014.11); *H04N 19/503* (2014.11)

(58) Field of Classification Search
CPC .. H04N 19/159; H04N 19/176; H04N 19/186; H04N 19/1883; H04N 19/423; H04N 19/503; H04N 19/593; H04N 19/70; H04N 19/96
See application file for complete search history.

(56) References Cited

U.S. PATENT DOCUMENTS

| | | | |
|---|---|---|---|
| 2016/0360210 A1* | 12/2016 | Xiu | H04N 19/186 |
| 2017/0272748 A1 | 9/2017 | Seregin et al. | |
| 2018/0115776 A1* | 4/2018 | Holcomb | H04N 19/132 |
| 2018/0160141 A1 | 6/2018 | He et al. | |
| 2018/0184083 A1 | 6/2018 | Panusopone et al. | |
| 2018/0288441 A1 | 10/2018 | Zhang et al. | |
| 2018/0302640 A1* | 10/2018 | Li | H04N 19/23 |
| 2019/0246113 A1* | 8/2019 | Xu | H04N 19/44 |

FOREIGN PATENT DOCUMENTS

| | | | | |
|---|---|---|---|---|
| KR | 1020150126010 A | | 11/2015 | |
| WO | WO-2015194913 A1 * | | 12/2015 | H04N 19/105 |

OTHER PUBLICATIONS

Bross, Benjamin et al., "Versatile Video Coding (Draft 4)," Joint Video Experts Team (JVET) of ITU-T SG 16 WP 3 and ISO/IEC JTC 1/SC 29/WG 11. Jan. 2019. doc: JVET-M1001-v6.

* cited by examiner (a) QUADTREE PARTITIONING    (b) VERTICAL BINARY TREE PARTITIONING (c) HORIZONTAL BINARY TREE PARTITIONING    (d) TERNARY TREE PARTITIONING Left CTU  Curr CTU
(a)

Left CTU  Curr CTU
(b)

Left CTU  Curr CTU
(c)

Left CTU  Curr CTU
(d)

(a)    (b)

☐ SAMPLE POSITION OF CORRESPONDING LUMA SUBBLOCK FOR DERIVING BLOCK VECTOR OF CHROMA COMPONENT BLOCK

FIG. 22

| INTRA BLOCK COPY SKIP MODE | INTRA BLOCK COPY SKIP MODE |
|---|---|
| INTRA BLOCK COPY SKIP MODE | INTRA BLOCK COPY SKIP MODE |
| INTRA BLOCK COPY SKIP MODE | INTRA BLOCK COPY SKIP MODE |
| INTRA BLOCK COPY SKIP MODE | INTRA BLOCK COPY SKIP MODE |

FIG. 23

| INTRA BLOCK COPY SKIP MODE | INTRA BLOCK COPY MERGE MODE |
|---|---|
| INTRA BLOCK COPY SKIP MODE | INTRA BLOCK COPY AMVP MODE |
| INTRA BLOCK COPY MERGE MODE | INTRA BLOCK COPY AMVP MODE |
| INTRA BLOCK COPY SKIP MODE | INTRA BLOCK COPY SKIP MODE |

FIG. 24A

| | Descriptor |
|---|---|
| coding_unit( x0, y0, cbWidth, cbHeight, treeType ) { | |
|   if( tile_group_type != I || sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] == 0 && tile_group_type != I ) | |
|       pred_mode_flag | ae(v) |
|     if( ( ( tile_group_type == I && cu_skip_flag[ x0 ][ y0 ] == 0 ) || ( tile_group_type != I && CuPredMode[ x0 ][ y0 ] != MODE_INTRA ) ) && sps_ibc_enabled_flag ) | |
|       pred_mode_ibc_flag | ae(v) |
|   } | |
|   if( CuPredMode[ x0 ][ y0 ] == MODE_INTRA ) { | |
|   ... | |
|   } else if( treeType != DUAL_TREE_CHROMA ) { /* MODE_INTER or MODE_IBC */ | |
|     if( cu_skip_flag[ x0 ][ y0 ] == 0 ) | |
|       merge_flag[ x0 ][ y0 ] | ae(v) |
|     if( merge_flag[ x0 ][ y0 ] ) { | |
|       merge_data( x0, y0, cbWidth, cbHeight ) | |
|     } else if ( CuPredMode[ x0 ][ y0 ] == MODE_IBC ) { | |
|       mvd_coding( x0, y0, 0, 0 ) | |
|       mvp_l0_flag[ x0 ][ y0 ] | ae(v) |
|       if( sps_amvr_enabled_flag && ( MvdL0[ x0 ][ y0 ][ 0 ] != 0 || MvdL0[ x0 ][ y0 ][ 1 ] != 0 ) ) { | |
|         amvr_precision_flag[ x0 ][ y0 ] | ae(v) |
|       } | |
|     } else { | |
|       ... | |
|     } | |
|   } | |
|   if( !pcm_flag[ x0 ][ y0 ] ) { | |
|     if( CuPredMode[ x0 ][ y0 ] != MODE_INTRA && merge_flag[ x0 ][ y0 ] == 0 ) | |
|       cu_cbf | ae(v) |
|     if( cu_cbf ) { | |
|       transform_tree( x0, y0, cbWidth, cbHeight, treeType ) | |
|     } | |
|   } | |
| } | |

FIG. 24B

| | Descriptor |
|---|---|
| transform_unit( x0, y0, tbWidth, tbHeight, treeType ) { | |
| if( treeType == SINGLE_TREE || treeType == DUAL_TREE_LUMA ) { | |
| if( ( IntraSubPartitionsSplitType == ISP_NO_SPLIT && !( cu_sbt_flag && ( ( subTuIndex == 0 && cu_sbt_pos_flag ) \|\| | |
| ( subTuIndex == 1 && !cu_sbt_pos_flag ) ) ) ) \|\| ( IntraSubPartitionsSplitType != ISP_NO_SPLIT && | |
| ( subTuIndex < NumIntraSubPartitions − 1 \|\| !InferTuCbfLuma ) ) ) | |
| tu_cbf_luma[ x0 ][ y0 ] | ae(v) |
| if( IntraSubPartitionsSplitType != ISP_NO_SPLIT ) | |
| InferTuCbfLuma = InferTuCbfLuma && !tu_cbf_luma[ x0 ][ y0 ] | |
| } | |
| if( treeType == SINGLE_TREE || treeType == DUAL_TREE_CHROMA ) { | |
| if( ( IntraSubPartitionsSplitType == ISP_NO_SPLIT && !( cu_sbt_flag && ( ( subTuIndex == 0 && cu_sbt_pos_flag ) \|\| | |
| ( subTuIndex == 1 && !cu_sbt_pos_flag ) ) ) ) \|\| ( IntraSubPartitionsSplitType != ISP_NO_SPLIT && | |
| ( subTuIndex == NumIntraSubPartitions − 1 ) ) ) { | |
| tu_cbf_cb[ x0 ][ y0 ] | ae(v) |
| tu_cbf_cr[ x0 ][ y0 ] | ae(v) |
| } | |
| } | |
| if( tu_cbf_luma[ x0 ][ y0 ] ) | |
| residual_coding( x0, y0, Log2( tbWidth ), Log2( tbHeight ), 0 ) | |
| if( tu_cbf_cb[ x0 ][ y0 ] ) | |
| residual_coding( xC, yC, Log2( wC ), Log2( hC ), 1 ) | |
| if( tu_cbf_cr[ x0 ][ y0 ] ) | |
| residual_coding( xC, yC, Log2( wC ), Log2( hC ), 2 ) | |
| } | |

FIG. 25

| | Descriptor |
|---|---|
| transform_unit( x0, y0, tbWidth, tbHeight, treeType, subTuIndex ) { | |
| if( treeType == SINGLE_TREE || (treeType == DUAL_TREE_LUMA && CuPredMode[x0][y0]==MODE_INTRA)) { | |
| if( (IntraSubPartitionsSplitType == ISP_NO_SPLIT && !( cu_sbt_flag && ( ( subTuIndex == 0 && cu_sbt_pos_flag ) || | |
| ( subTuIndex == 1 && !cu_sbt_pos_flag ) ) ) ) || ( IntraSubPartitionsSplitType != ISP_NO_SPLIT && | |
| ( subTuIndex < NumIntraSubPartitions − 1 || !InferTuCbfLuma ) ) ) | |
| tu_cbf_luma[ x0 ][ y0 ] | ae(v) |
| if (IntraSubPartitionsSplitType != ISP_NO_SPLIT) | |
| InferTuCbfLuma = InferTuCbfLuma && !tu_cbf_luma[ x0 ][ y0 ] | |
| } | |
| if ( treeType == SINGLE_TREE || treeType == DUAL_TREE_CHROMA ) { | |
| if( ( IntraSubPartitionsSplitType == ISP_NO_SPLIT && !( cu_sbt_flag && ( ( subTuIndex == 0 && cu_sbt_pos_flag ) || | |
| ( subTuIndex == 1 && !cu_sbt_pos_flag ) ) ) ) || ( IntraSubPartitionsSplitType != ISP_NO_SPLIT && | |
| ( subTuIndex == NumIntraSubPartitions − 1 ) ) ) { | |
| tu_cbf_cb[ x0 ][ y0 ] | ae(v) |
| tu_cbf_cr[ x0 ][ y0 ] | ae(v) |
| } | |
| } | |

FIG. 26

| | Descriptor |
|---|---|
| transform_unit( x0, y0, tbWidth, tbHeight, treeType, subTuIndex ) { | |
|   if( treeType == SINGLE_TREE || treeType == DUAL_TREE_LUMA && 'CurPredMode[x0][y0]==MODE_IBC) { | |
|   if( ( IntraSubPartitionsSplitType == ISP_NO_SPLIT && !( cu_sbt_flag && ( ( subTuIndex == 0 && cu_sbt_pos_flag ) || | |
|     ( subTuIndex == 1 && !cu_sbt_pos_flag ) ) ) ) || ( IntraSubPartitionsSplitType != ISP_NO_SPLIT && | |
|     ( subTuIndex < NumIntraSubPartitions − 1 || !InferTuCbfLuma ) ) ) | |
|     tu_cbf_luma[ x0 ][ y0 ] | ae(v) |
|   if( IntraSubPartitionsSplitType != ISP_NO_SPLIT ) | |
|     InferTuCbfLuma = InferTuCbfLuma && !tu_cbf_luma[ x0 ][ y0 ] | |
|   } | |
|   if( treeType == SINGLE_TREE || treeType == DUAL_TREE_CHROMA ) { | |
|   if( ( IntraSubPartitionsSplitType == ISP_NO_SPLIT && !( cu_sbt_flag && ( ( subTuIndex == 0 && cu_sbt_pos_flag ) || | |
|     ( subTuIndex == 1 && !cu_sbt_pos_flag ) ) ) ) || ( IntraSubPartitionsSplitType != ISP_NO_SPLIT && | |
|     ( subTuIndex == NumIntraSubPartitions − 1 ) ) ) { | |
|     tu_cbf_cb[ x0 ][ y0 ] | ae(v) |
|     tu_cbf_cr[ x0 ][ y0 ] | ae(v) |
|   } | |
|   } | |
| ... | |

FIG. 27

| | Descriptor |
|---|---|
| transform_unit( x0, y0, tbWidth, tbHeight, treeType, subTuIndex ) { | |
|   if( treeType == SINGLE_TREE \|\| treeType == DUAL_TREE_CHROMA ) { | |
|     if( ( IntraSubPartitionsSplitType == ISP_NO_SPLIT && !( cu_sbt_flag && ( ( subTuIndex == 0 && cu_sbt_pos_flag ) \|\| | |
|       ( subTuIndex == 1 && !cu_sbt_pos_flag ) ) ) ) \|\| | |
|       ( IntraSubPartitionsSplitType != ISP_NO_SPLIT && ( subTuIndex == NumIntraSubPartitions − 1 ) ) ) { | |
|       tu_cbf_cb[ x0 ][ y0 ] | ae(v) |
|       tu_cbf_cr[ x0 ][ y0 ] | ae(v) |
|     } | |
|   } | |
|   if( treeType == SINGLE_TREE \|\| treeType == DUAL_TREE_LUMA ) { | |
|     if( ( IntraSubPartitionsSplitType == ISP_NO_SPLIT && !( cu_sbt_flag && ( ( subTuIndex == 0 && cu_sbt_pos_flag ) \|\| | |
|       ( subTuIndex == 1 && !cu_sbt_pos_flag ) ) ) && ( CuPredMode[ x0 ][ y0 ] == MODE_INTRA \|\| | |
|       tu_cbf_cb[ x0 ][ y0 ] \|\| tu_cbf_cr[ x0 ][ y0 ] \|\| CbWidth[ x0 ][ y0 ] > MaxTbSizeY \|\| CbHeight[ x0 ][ y0 ] > MaxTbSizeY ) ) \|\| | |
|       ( IntraSubPartitionsSplitType != ISP_NO_SPLIT && ( subTuIndex < NumIntraSubPartitions − 1 \|\| !InferTuCbfLuma ) ) ) { | |
|       tu_cbf_luma[ x0 ][ y0 ] | ae(v) |
|     } | |
|   } | |

INTRA BLOCK COPY-BASED ENCODING/DECODING METHOD AND DEVICE, AND BITSTREAM STORAGE MEDIUM

CROSS-REFERENCE TO RELATED APPLICATIONS

This application is a continuation of U.S. application Ser. No. 17/438,333, filed on Sep. 10, 2021, which is a National Stage Entry of PCT International Application No. PCT/KR2020/003383, filed on Mar. 11, 2020, which claims priority to Korean Patent Application No. 10-2019-0073120, filed on Jun. 19, 2019, Korean Patent Application No. 10-2019-0072465, filed on Jun. 18, 2019, Korean Patent Application No. 10-2019-0029182, filed on Mar. 14, 2019, and Korean Patent Application No. 10-2019-0027805, filed on Mar. 11, 2019, the entire contents of which are hereby incorporated by references in its entirety.

TECHNICAL FIELD

The present invention relates to an image encoding/decoding method and apparatus, and a recording medium for storing a bitstream. More particularly, the present invention relates to a method and apparatus for encoding/decoding an image based on intra block copy, and a recording medium for storing a bitstream generated by the image encoding method or apparatus of the present invention.

BACKGROUND ART

Recently, the demand for high resolution and quality images such as high definition (HD) or ultra-high definition (UHD) images has increased in various applications. As the resolution and quality of images are improved, the amount of data correspondingly increases. This is one of the causes of increase in transmission cost and storage cost when transmitting image data through existing transmission media such as wired or wireless broadband channels or when storing image data. In order to solve such problems with high resolution and quality image data, a high efficiency image encoding/decoding technique is required.

There are various video compression techniques such as an inter prediction technique of predicting the values of pixels within a current picture from the values of pixels within a preceding picture or a subsequent picture, an intra prediction technique of predicting the values of pixels within a region of a current picture from the values of pixels within another region of the current picture, a transform and quantization technique of compressing the energy of a residual signal, and an entropy coding technique of allocating frequently occurring pixel values with shorter codes and less occurring pixel values with longer codes.

In a conventional image encoding/decoding method and apparatus, if a luma component and a chroma component have different block partitioning structures in an intra block copy based encoding process, encoding information of the luma component is restrictively used in the encoding process of the chroma component. Therefore, there is a limit in encoding efficiency improvement.

DISCLOSURE

Technical Problem

An object of the present invention is to provide an image encoding/decoding method and apparatus with improved compression efficiency.

Another object of the present invention is to provide an image encoding/decoding method and apparatus using intra block copy with improved compression efficiency.

Another object of the present invention is to provide a recording medium for storing a bitstream generated by an image encoding/decoding method or apparatus according to the present invention.

Technical Solution

A method of decoding an image includes acquiring prediction mode information of a current block from a bitstream, deriving a prediction mode of the current block using the prediction mode information of the current block, acquiring information indicating whether a residual signal of a transform block for the current block is present based on at least one of information on partitioning of the current block or the prediction mode of the current block, and reconstructing the current block based on the information indicating whether the residual signal of the transform block is present.

The information on partitioning of the current block may indicate a partitioning structure between a luma block and a chroma block corresponding to the current block, and the partitioning structure between the luma block and the chroma block may be one of the same block partitioning structure and an independent block partitioning structure.

The prediction mode of the current block may be at least one of an intra prediction mode, an inter prediction mode or an intra block copy prediction mode.

When the information on partitioning of the current block has an independent block partitioning structure for the luma block and the prediction mode of the current block is an intra block copy prediction mode, the information indicating whether the residual signal is present may not be decoded.

When the prediction mode of the current mode is an intra block copy prediction mode, the reconstructing of the current block may include deriving a block vector for the current block, and reconstructing the current block using the derived block vector.

The block vector may be derived based on a reference region buffer capable of being referred to by the block vector, and a size of the reference region buffer may be a predetermined integer multiple of a size of an encoding tree block including the current block.

The reference region buffer may be initialized in units of at least one of pictures, slices, tile groups, tiles, coding tree units (CTUs), CTU rows or CTU columns.

The initialized value may be −1.

The reference region buffer may store a reconstructed image sample value of a prediction block corresponding to the current block, which is acquired using the block vector.

When the size of the encoding tree block is 128×128, the predetermined integer may be 2.

According to the present invention, a method of encoding an image includes encoding information indicating whether a residual signal of a transform block for a current block is present based on at least one of information on partitioning of the current block or a prediction mode of the current block; and encoding the current block based on the information indicating whether the residual signal of the transform block is present.

The information on partitioning of the current block may indicate a partitioning structure between a luma block and a chroma block corresponding to the current block, and the partitioning structure between the luma block and the chroma block may be one of the same block partitioning structure and an independent block partitioning structure.

The prediction mode of the current block may be at least one of an intra prediction mode, an inter prediction mode or an intra block copy prediction mode.

When the information on partitioning of the current block has an independent block partitioning structure for the luma block and the prediction mode of the current block is an intra block copy prediction mode, the information indicating whether the residual signal is present may not be decoded.

When the prediction mode of the current mode is an intra block copy prediction mode, the encoding of the current block may include deriving a block vector for the current block, and encoding the current block using the derived block vector.

The block vector may be derived based on a reference region buffer capable of being referred to by the block vector, and a size of the reference region buffer may be a predetermined integer multiple of a size of an encoding tree block including the current block.

The reference region buffer may be initialized in units of at least one of pictures, slices, tile groups, tiles, coding tree units (CTUs), CTU rows or CTU columns.

The initialized value may be −1.

The reference region buffer may store a reconstructed image sample value of a prediction block corresponding to the current block, which is acquired using the block vector.

A recording medium according to the present invention may store a bitstream generated by the image encoding method according to the present invention.

Advantageous Effects

According to the present invention, it is possible to provide an image encoding/decoding method and apparatus with improved compression efficiency.

According to the present invention, it is possible to provide an image encoding/decoding method and apparatus using intra block copy with improved compression efficiency.

According to the present invention, it is possible to provide a recording medium for storing a bitstream generated by an image encoding/decoding method or apparatus according to the present invention.

DESCRIPTION OF DRAWINGS

FIG. 22 is a view illustrating when prediction encoding modes of luma component subblocks corresponding to chroma component blocks according to an embodiment of the present invention are the same.

FIG. 23 is a view illustrating when prediction encoding modes of luma component subblocks corresponding to chroma component blocks according to an embodiment of the present invention are different.

FIGS. 24A, 24B, and 25 to 27 are views illustrating encoding information transmitted in association with intra block partitioning according to an embodiment of the present invention.

MODE FOR INVENTION

Figure 1:
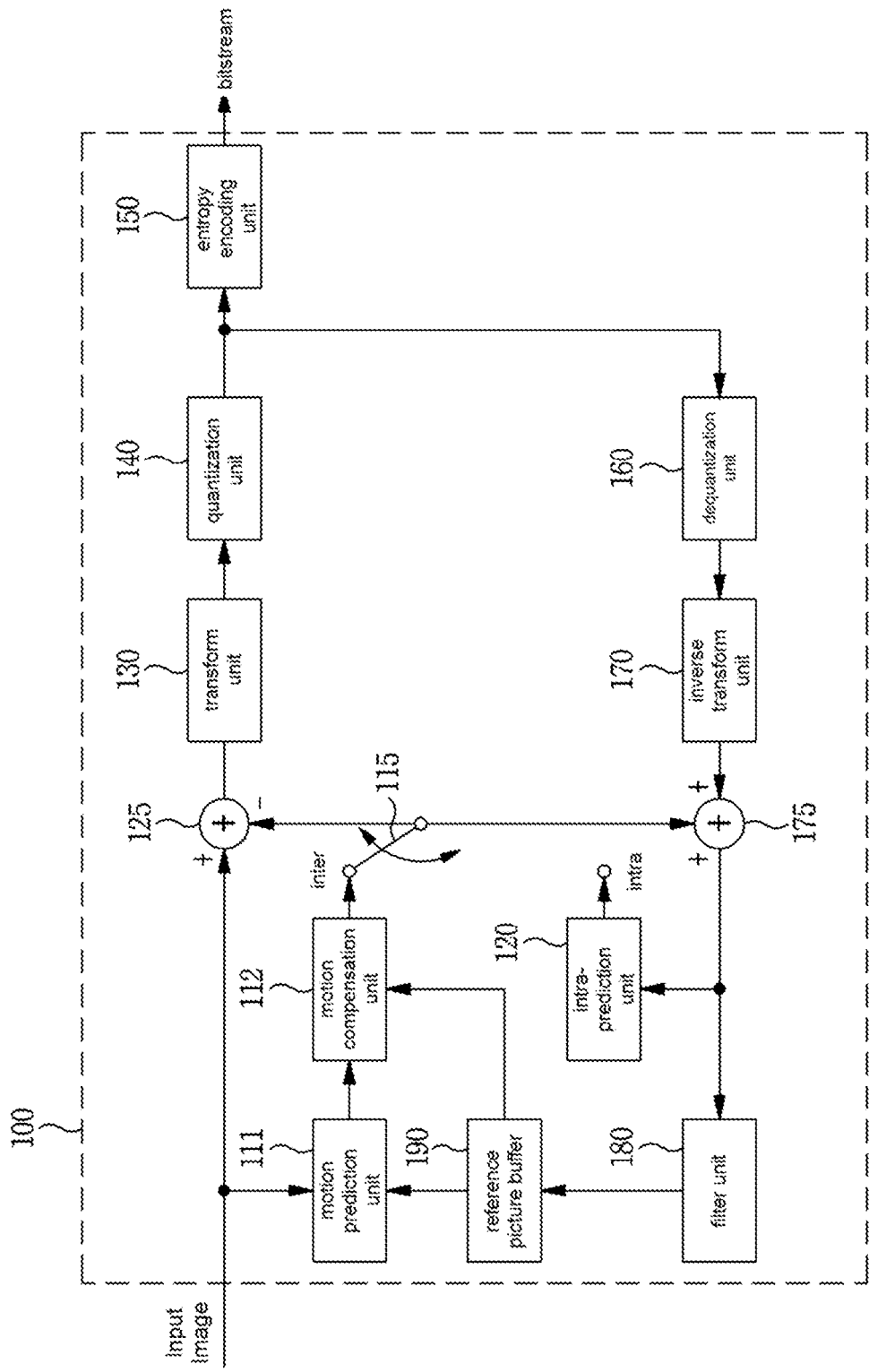
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, a coding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
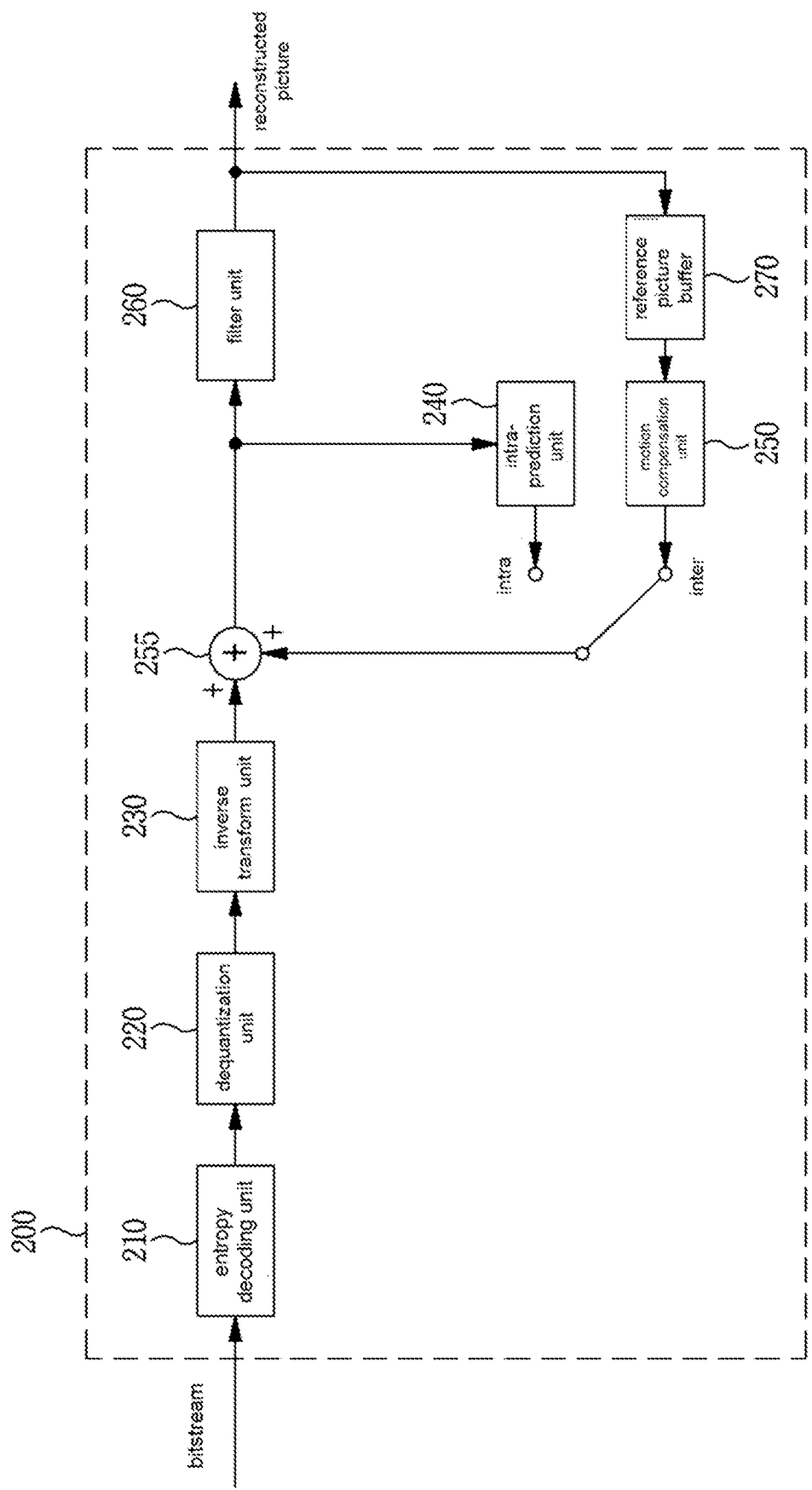
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
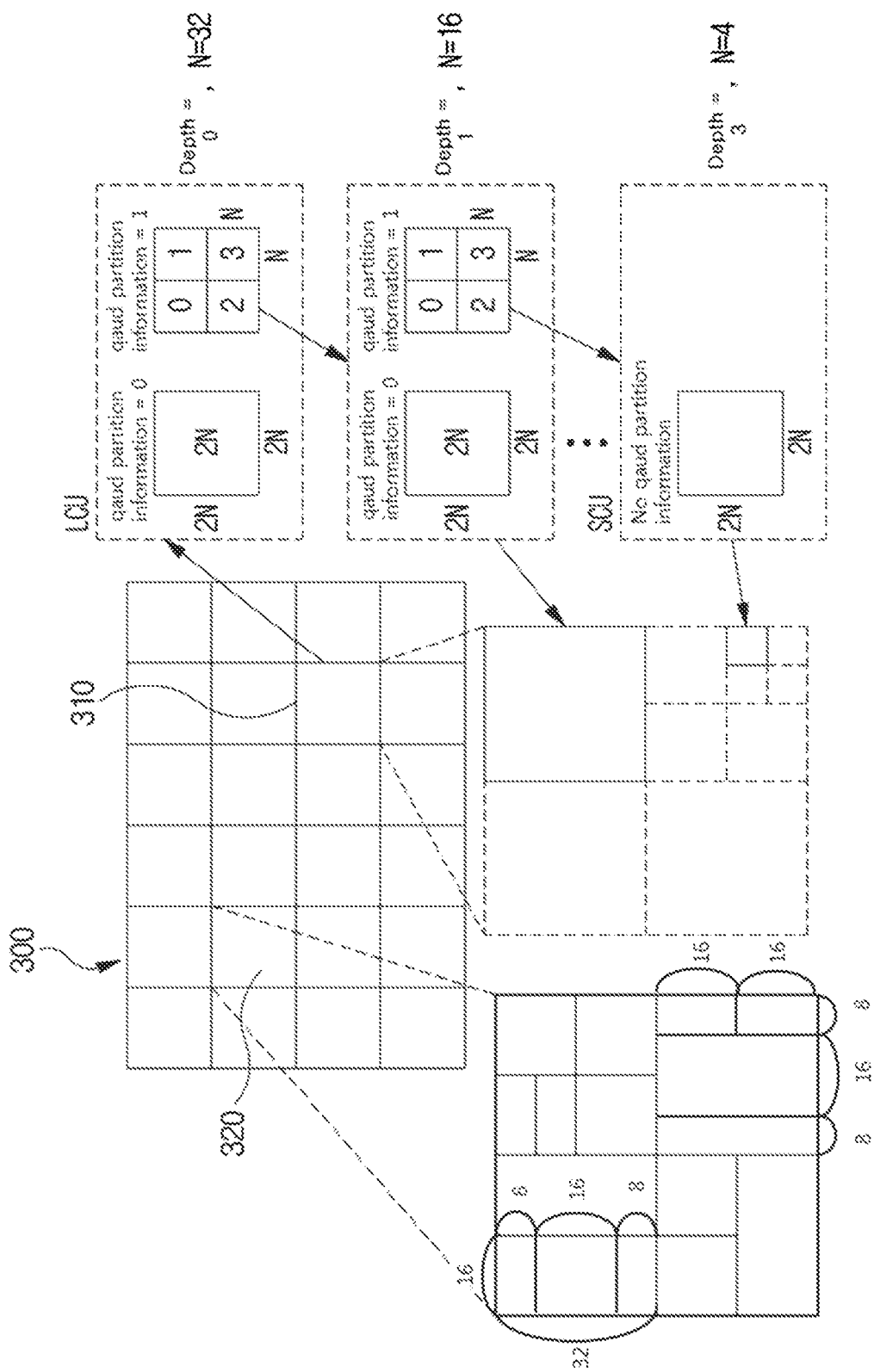
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (height) of the coding unit is larger than the vertical size (height) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
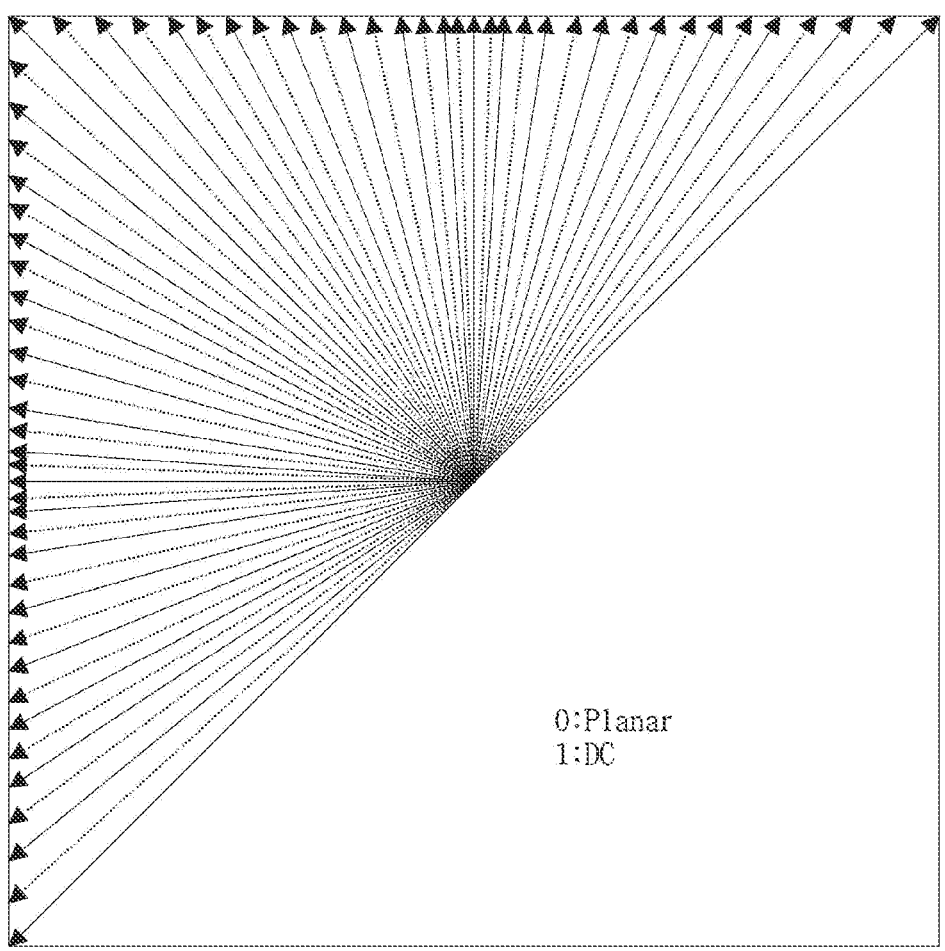
FIG. 4 is a view showing an intra-prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using a coding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
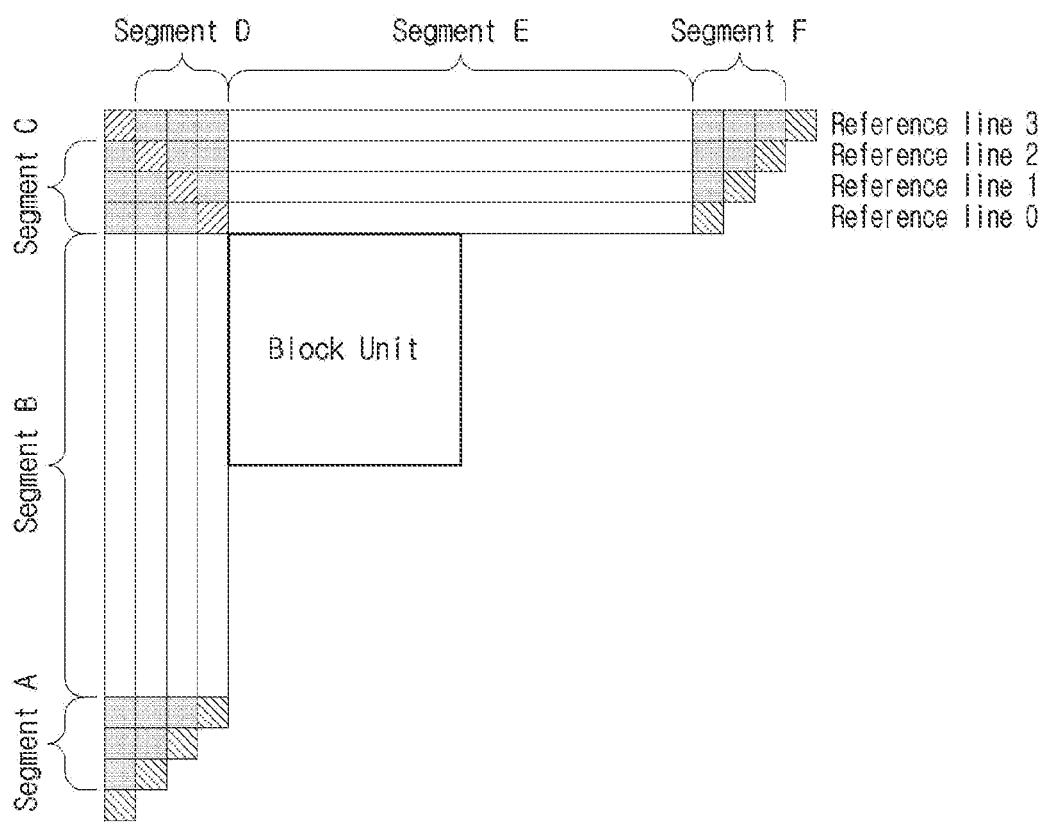
FIG. 7 is a diagram illustrating reference samples capable of being used for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. For example, in FIG. 7, reference sample line indicators 0, 1, and 2 may be signaled as index information indicating reference sample lines 0, 1 and 2. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
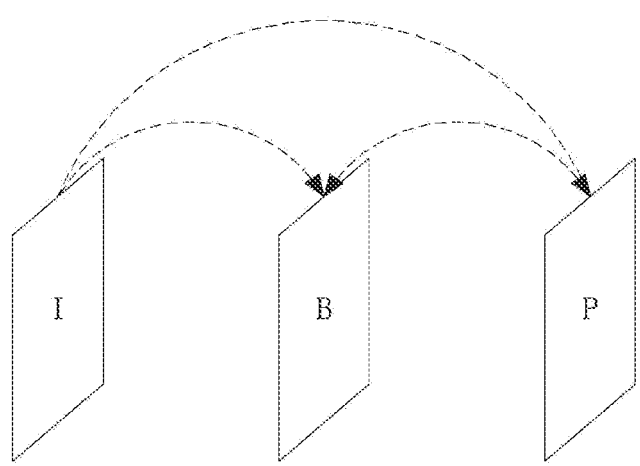
FIG. 5 is a diagram illustrating an embodiment of an inter-picture prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a geometric partitioning mode, an combined inter intra prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The geometric partitioning mode may mean a mode that derives motion information by partitioning the current block into the predefined directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
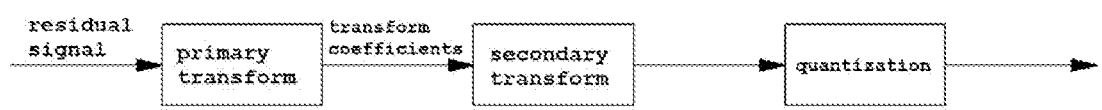
FIG. 6 is a diagram illustrating a transform and quantization process.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loève transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Figure 8A:
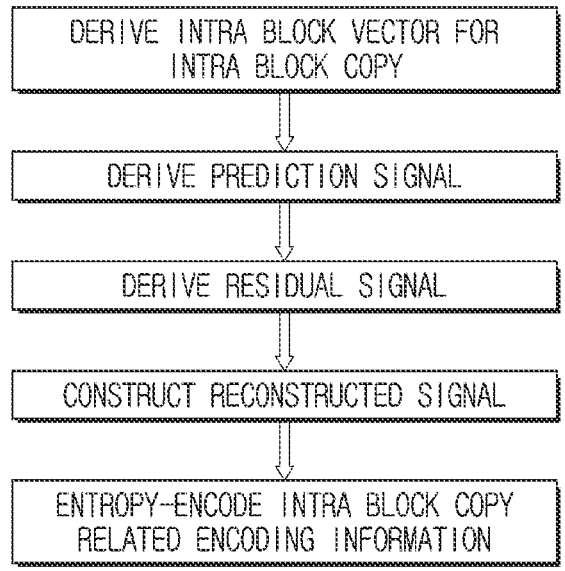
FIG. 8A is a flowchart illustrating an image encoding method according to an embodiment of the present invention.
Figure 8B:
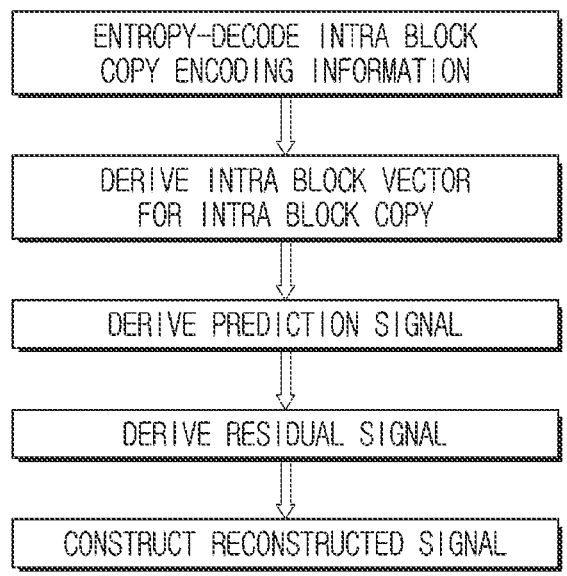
FIG. 8B is a flowchart illustrating an image decoding method according to an embodiment of the present invention.

FIG. 8A is a flowchart illustrating an image encoding method according to an embodiment of the present invention, and FIG. 8B is a flowchart illustrating an image decoding method according to an embodiment of the present invention.

Hereinafter, an encoding/decoding method of the present disclosure will be described.

A single picture may be encoded using one of an intra prediction, inter prediction or intra block copy prediction method.

An intra block copy prediction based encoding/decoding method may be used when a luma component and a chroma component have independent block partitioning structures (that is, a dual tree structure) or when a luma component and a chroma component have the same block partitioning structure (that is, a single tree structure).

The intra block copy prediction method may mean a method of deriving a prediction block from an encoded/decoded region in the same picture (that is, intra) using a derived block vector.

Figure 9:
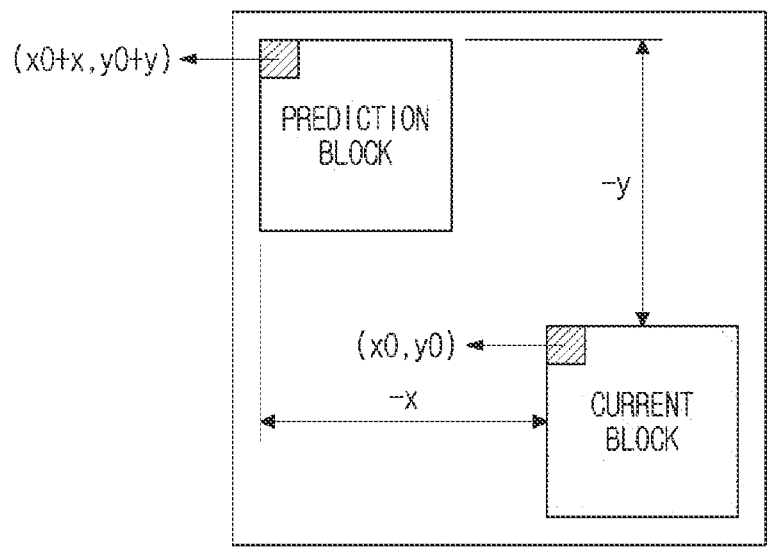
FIG. 9 is a view illustrating a relation between a current block and a prediction block according to an embodiment of the present invention.

When a block to be currently encoded/decoded (that is, a current block) is encoded/decoded using the intra block copy prediction method and a derived block vector is (x, y), a block having the same size as the current block, which is separated from the current block by x pixels in a horizontal direction (that is, x rightward in the horizontal direction if x is a positive integer and −x leftward in the horizontal direction if x is a negative integer) and y pixels in a vertical direction (that is, y downward in the vertical direction if y is a positive integer and −y upward in the vertical direction if y is a negative integer), may be used as a prediction block of the current block. For example, FIG. 9 is a view illustrating a relation between a current block and a prediction block according to an embodiment of the present invention. Referring to FIG. 9, when x and y are negative integers and the upper left sample position of the current block is (x0, y0), the upper left sample position of the prediction block of the current block is (x0+x, y0+y).

If a current luma component block uses intra block copy prediction, the block may be encoded/decoded using one of the following methods.

Intra block copy SKIP mode in which the block vector of a current block is derived from the block vector of a block encoded/decoded before the current block, similar to a skip mode in an inter prediction method, and a residual signal is not present Intra block copy MERGE mode in which the block vector of a current block is derived from the block vector of a block encoded/decoded before the current block, similar to a merge mode of an inter prediction method, and a residual signal is present Intra block copy AMVP mode in which a block vector is encoded similar to an AMVP mode of the inter prediction method According to an embodiment, the encoding mode of the current luma component block in a decoder may be derived as follows.

At least one of the below-described encoding information may be used to determine the encoding mode of the current luma component block, and at least one of the encoding information may be included and transmitted in a bitstream.

The encoding information may include information indicating that the luma component block is in a SKIP mode (e.g., a SKIP mode identifier, a flag, an index, skip_flag, cu_skip_flag, etc.).

When information indicating the SKIP mode has a specific value, this indicates that the luma component block is in the SKIP mode. For example, if the identifier, the flag or the index has a first value of 1, this indicates that the luma component block is in the SKIP mode and, if the identifier, the flag or the index has a second value of 0, this indicates that the luma component block is not in the SKIP mode.

The encoding information may include the prediction mode information (e.g., an index, an identifier, a flag, etc.) of the luma component block. The prediction mode information may include an intra prediction mode, an inter prediction mode, an intra block copy prediction mode, etc.

For example, the syntax indicating the prediction mode information having a first value of 0 indicates that an intra prediction mode is applied, the syntax having a second value of 1 indicates that an inter prediction mode is applied, and the syntax having a third value of 2 indicates that an intra block copy prediction mode is applied.

As another example, first prediction mode information (e.g., identifier, flag, identifier, pred_mode_flag, etc.) may indicate whether an intra prediction mode is applied. The first prediction mode information having a first value of 1 indicates that an intra prediction mode is applied and the first prediction mode information having a second value of 0 indicates that an intra prediction mode is not applied. If the intra prediction mode is not applied, second prediction mode information (e.g., identifier, flag, identifier, pred_mode_ibc_flag, etc.) may be received to indicate whether an inter prediction mode or an intra block copy prediction is applied. The second prediction mode information having a first value of 1 may indicate that an intra block copy prediction mode is applied and the second prediction mode information having a second value of 0 may indicate that an inter prediction mode is applied.

As another example, the first prediction mode information (e.g., identifier, flag, identifier, pred_mode_flag, etc.) may indicate whether the prediction mode of the luma component block is an intra prediction mode or an inter prediction mode. The first prediction mode information having a first value of 1 may indicate an intra prediction mode, and the first prediction mode information having a second value of 0 may indicate an inter prediction mode. Additionally, the second prediction mode information (e.g., identifier, flag, identifier, pred_mode_ibc_flag, etc.) may be transmitted or derived, the second prediction mode information having a first value of 1 may indicate that an intra block copy mode is applied, and the second prediction mode information having a second value of 0 may indicate that the prediction mode of the luma component block is determined as an intra prediction mode or an inter prediction mode determined in the first prediction mode information. In the above embodiment and/or the below-described embodiments, the first value and the second value may be different. For example, the first value may be 0 and the second value may be 1.

The encoding information may include information indicating that the luma component block is in a Merge mode (e.g., a MERGE mode identifier, a flag, an index, merge_flag, etc.).

When the current luma component block is not in the SKIP mode but is in an intra block copy mode, the MERGE mode having a specific value may indicates a MERGE mode. For example, the identifier, flag or index having a first value of 1 may indicate that a MERGE mode is applied, and the identifier, flag or index having a second value of 0 may indicate that the MERGE mode is not applied.

The encoding mode of the current luma component block may be determined using the encoding information as follows.

For example, when the luma component block is in the SKIP mode and a tile group, slice or tile is of Type I, the prediction mode information may not be received and the block may be determined as an intra block copy SKIP mode, because a prediction mode applicable in the case of Type I includes an intra prediction mode and an intra block copy prediction mode and the SKIP mode is not present in the intra prediction mode.

As another example, when the luma component block is in the SKIP mode and the tile group, slice or tile is not of Type I, the prediction mode information may be received. At this time, upon determining that the luma component block is in an intra block copy prediction mode based on the prediction mode information, it may be determined that the luma block is in the intra block copy SKIP mode.

As another example, when the luma component block is not in the SKIP mode and it is determined that, based on the prediction mode information, the luma component block is in the intra block copy prediction mode, information indicating a MERGE mode may be received. Alternatively, for example, when the luma component block is not in the SKIP mode, information indicating the MERGE mode may be received. At this time, when the information indicating the MERGE mode indicates that the luma component block is in the MERGE mode, it may be determined that the luma component block is in an intra block copy MERGE mode.

As another example, when the luma component block is not in the SKIP mode and is not in the MERGE mode but is in the intra block copy prediction mode, it may be determined that the luma component block is in an intra block copy AMVP mode. For example, whether the luma component is in the intra block copy MERGE mode or the intra block copy AMVP mode may be determined based on information indicating the MERGE mode.

In a decoder, the encoding mode of the current luma component block or the current chroma component block may be derived as follows.

When the luma component and the chroma component has the same block partitioning structure (that is, single tree structure), the encoding mode may be determined as described below.

For example, the prediction mode (e.g., intra prediction, inter prediction or intra block copy prediction) of the chroma component block may be equal to the prediction mode of the luma component block corresponding thereto.

As another example, when the corresponding luma component block is in an intra block copy SKIP mode, a residual signal may not be encoded/decoded and residual signal information may not be transmitted, in a chroma component block. At this time, information (e.g., cu_cbf, tu_cbf, etc.) indicating that the residual signal information is not transmitted may not be transmitted in a bitstream.

As another example, when the luma component and the chroma component have the same block partitioning structure and a current chroma component block is in an intra block copy prediction mode (or when the luma component block corresponding to the current chroma component block is in an intra block copy prediction mode), information necessary to encode/decode the current chroma component block may be derived from the encoding/decoding information of the luma component block corresponding to the current chroma component block.

When the luma component and the chroma component have independent block partitioning structures (That is, dual tree structure), the prediction mode of the chroma component block may be determined from the prediction mode information of the chroma component block included and transmitted in the bitstream. The prediction mode of the chroma component block may include an intra prediction mode, an inter prediction mode, an intra block copy prediction mode, etc., as in the prediction mode of the luma component block.

For example, the syntax indicating the prediction mode information having a first value of 0 may indicate an intra prediction mode, the syntax having a second value of 1 may indicate an inter prediction mode, and the syntax having a third value of 2 may indicate an intra block copy prediction mode.

As another example, the first prediction mode information (e.g., identifier, flag, identifier, pred_mode_flag, etc.) may indicate that the prediction mode of the chroma component block is an intra prediction mode. The first prediction mode information having a first value of 1 may indicate that an intra prediction mode is applied and the first prediction mode information having a second value of 0 may indicate that an intra prediction mode is not applied. When the intra prediction mode is not applied, the second prediction mode information (e.g., identifier, flag, identifier, pred_mode_ibc_flag, etc.) may be received to indicate whether the prediction mode of the chroma component block is an inter prediction mode or an intra block copy prediction mode. The second prediction mode information having a first value of 1 may indicate that the intra block copy prediction mode is applied and the second prediction mode information having a second value of 0 may indicating that the inter prediction mode is applied.

As another example, the first prediction mode information (e.g., identifier, flag, identifier, pred_mode_flag, etc.) may indicate whether the prediction mode of the chroma component block is an intra prediction mode or an inter prediction mode. The first prediction mode information having a first value of 1 may indicate an intra prediction mode and the first prediction mode information having a second value of 0 may indicate an inter prediction mode. Additionally, the second prediction mode information (e.g., identifier, flag, identifier, pred_mode_ibc_flag, etc.) may be transmitted or derived, the second prediction mode information having a first value of 1 may indicate that an intra block copy mode is applied and the second prediction mode information having a second value of 0 may indicate that the prediction mode of the chroma component block is determined as an intra prediction mode or an inter prediction mode determined in the first prediction mode information.

As another example, the second prediction mode information (e.g., identifier, flag, identifier, pred_mode_ibc_flag, etc.) may be transmitted or derived, the second prediction mode information having a first value of 1 may indicate an intra block copy mode and the second prediction mode information having a second value of 0 may indicate an intra prediction mode.

When the luma component and the chroma component have independent block partitioning structures and the current chroma component block is in an intra block copy prediction mode, information (e.g., a block vector, etc.) necessary to encode/decode the current chroma component block may be derived from the encoding/decoding information of the luma component block corresponding to the current chroma component block.

Hereinafter, step of deriving a block vector for intra block copy prediction will be described.

Step of deriving the block vector for intra block copy prediction may include at least one of step of deriving the block vector of the luma component block and step of deriving the block vector of the chroma component block.

Hereinafter, step of deriving the block vector of the luma component block will be described.

According to an embodiment, a method of deriving a block vector when the current block is a luma component block and is encoded in an intra block copy SKIP mode or an intra block copy MERGE mode will be described below.

In order to derive the block vector of the luma component block, a block vector candidate list may be constructed from block vector candidates of the luma component block encoded before the current block and one of the candidates in the constructed block vector candidate list may be used as the block vector of the current block. At this time, information (e.g., identifier, index, flag, merge_idx, etc.) for identifying the candidate in the block vector candidate list may be derived based on the encoding parameter transmitted in the bitstream.

The block vector candidate list may be composed of a maximum of N candidates. At this time, N may be a positive integer including 0. In addition, one or more candidates described below may be included in the block vector candidate list.

Figure 10:
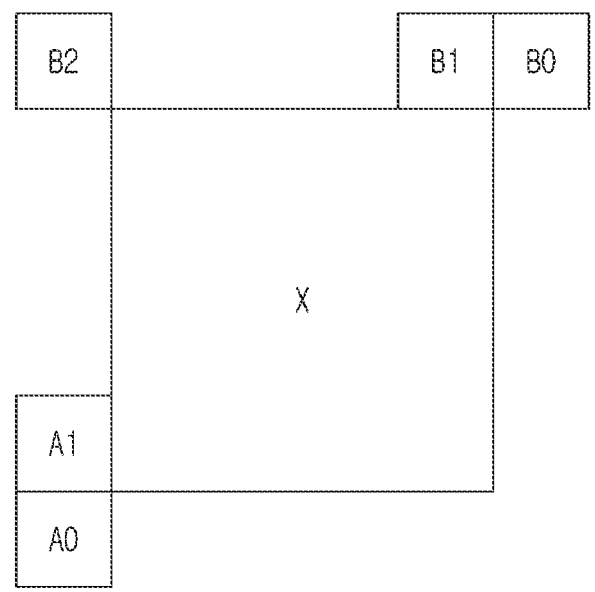
FIG. 10 is a view illustrating neighbor blocks adjacent to a current block according to an embodiment of the present invention.

FIG. 10 is a view illustrating neighbor blocks adjacent to a current block according to an embodiment of the present invention. Referring to FIG. 10, a block vector may be derived from at least one of a block B1 adjacent to the upper side of the current block X, a block A1 adjacent to the left side of the current block, a block B0 located at the upper right corner of the current block, a block B2 located at the upper left corner of the current block or a block A0 located at the left lower corner of the current block, and the derived block vector may be determined as the block vector candidate of the current block.

For example, the block B2 located at the upper left corner of the current block may not be used as the block vector candidate, if block vectors are present in all blocks A1, B1, B0 and A0.

As another example, whether a block vector is present in at least one of the blocks A0, A1, B0, B1 and B2 according to predetermined order of priority (that is, whether the block is encoded/decoded using the intra block copy prediction method) may be determined and, if the block vector is present, the block vector of the block may be determined as the vector candidate. At this time, the predetermined order of priority of the block vector candidate list may be A1, B1, B0, A0 and B2.

The block vector candidate list may be constructed by the predetermined order of priority and redundancy check between the block vector candidate present in the block vector candidate list and a newly added block vector candidate may be performed.

For example, when the block vector candidate list is constructed in order of A1, B1, B0, A0 and B2, redundancy check between the block B1 and the block A1 may be performed and redundancy the block B0 and the block B1 may be performed. In addition, redundancy check between the block A0 and the block A1 may be performed and redundancy the block B2 and the blocks A1 and B1 may be performed. Redundancy check may be performed only when the block vector is present in the block.

As another example, redundancy check may be performed between block vectors to be added and all block vectors present in the block vector candidate list.

When a block vector is present in at least one of the blocks A0, A1, B0, B1 and B2, whether the block vector of the block is available in the current block may be determined and, only if available, the block vector of the neighbor block may be determined as a block vector candidate. If not available, the block vector of the neighbor block may not be used as a block vector candidate. At this time, whether the block vector is available may be determined depending on whether a reference sample (block) at a position indicated by the block vector is available.

The block vectors of the blocks encoded/decoded before the current block may be stored in a buffer and at least one of the block vectors stored in the buffer may be determined as a block vector candidate. At this time, an intra block vector may be stored in a buffer having a specific size in order of encoding/decoding and, if the buffer is full, a firstly stored block vector may be deleted and a new (that is, a most recently encoded/decoded) block vector may be stored. The order of priority may be changed when the block vector candidate list may be constructed based on the order of the block vectors stored in the buffer (e.g., from oldest to latest or from latest to oldest). For example, the block vectors may be included in the block vector candidate list from a block vector most recently stored in the buffer to a block vector first stored in the buffer or from a block vector first stored in the buffer to a block vector most recently stored in the buffer. The block vector candidate may be referred to as a history-based block vector candidate.

When the block vector candidate list is constructed using at least one of the history-based block vector candidates, whether the history-based block vector candidate is available in the current block may be determined, and, only if available, the candidate may be added to the block vector candidate list. At this time, whether the history-based block vector is available may be determined depending on whether a reference sample (block) at a position indicated by the block vector is available.

When the block vector candidate list is constructed using at least one of the history-based block vector candidates, redundancy check may be performed between the history-based block vector candidate and the block vector candidates in the block vector candidate list and, if the same block vector is not present as the result of redundancy check, the candidate may be added to the block vector candidate list.

For example, when the block vector candidate list is constructed using at least one of the history-based block vector candidates, the candidate may be added to the block vector candidate list without performing redundancy check between a predetermined candidate of the history-based block vector candidates and the block vector candidates in the block vector candidate list. For example, the predetermined candidate may mean a block vector candidate except for a first candidate of the history-based block vector candidates. Here, the first candidate may mean a block vector candidate which is first or most recently stored in the history-based block vector list composed of the history-based block vector candidates.

As another example, when the block vector candidate list is constructed using at least one of the history-based block vector candidates, redundancy check may be performed between a predetermined candidate of the history-based block vector candidates and the block vector candidates in the block vector candidate list and the candidate may be added to the block vector candidate list. For example, the predetermined candidate may mean the first candidate of the history-based block vector candidates.

The buffer including the history-based block vector candidates may be maintained during encoding/decoding in units of pictures, slices, tiles, CTUs, CTU rows or CTU columns and used in units of pictures, slices, tiles, CTUs, CTU rows or CTU columns. In addition, the buffer may include at least one of encoding information of the blocks encoded/decoded before the current block in units of pictures, slices, tiles, CTUs, CTU rows or CTU columns.

When a combined block vector candidate may be constructed using at least two of the block vector candidates in the block vector candidate list. At this time, when the combined block vector candidate is constructed, the history-based block vector candidates may not be used. At this time, when the combined block vector candidate is constructed, the block vector candidates of adjacent neighbor blocks may not be used. At this time, whether the combined block vector candidate composed of the block vector candidates is available may be determined and, only if available, the combined block vector candidate may be used. At this time, whether the block vector is available may be determined depending on whether the reference sample (block) at a position indicated by the block vector is available.

If the width of the current luma block is W and the height of the current luma block is H, $(-(W<<n)+a, -(H<<n)+b)$, $(-(W<<n)+c, 0)$ or $(0, -(H<<n)+d)$ may be included in the block vector candidate list as block vector candidates. At this time, n may be a positive integer greater than 0, and a, b, c and d may each have an integer value. The block vector candidate may be referred to as a fixed base block vector candidate.

The block vector candidate list may be constructed in predetermined order using at least one of the block vectors of the adjacent neighbor block candidates, the history-based block vector candidates, the combined block vector candidates or the fixed base block vector candidates.

Here, the adjacent neighbor block may include at least one of A or A1 and at least one of B0, B1 or B2, referring to FIG. 10.

For example, the block vector candidate list may be constructed in order of the block vectors of the adjacent neighbor block candidates, the history-based block vector candidates, the combined block vector candidates and the fixed base block vector candidates.

In addition, for example, the fixed base block vector may be constructed in the following order until the number of candidates in the block vector candidate list satisfies a maximum number (or a maximum number of block vector candidates).

1. $(-(W<<1), 0)$
2. $(0, -(H<<1))$
3. $(-(W<<1)-1, 0)$
4. $(0, -(H<<1)-1)$
5. $(-(W<<1)-2, 0)$
6. $(0, -(H<<1)-2)$
7. $(-(W<<1)-3, 0)$
8. $(0, -(H<<1)-3)$
9. $(-(W<<1)-4, 0)$
10. $(0, -(H<<1)-4)$

Alternatively, the fixed base block vector may be a vector (0,0), and a block vector candidate list having a maximum number of candidates may be constructed by adding the fixed base block vector until the number of candidates in the block vector candidate list satisfies the maximum number. For example, the fixed base block vector may be added to the block vector candidate list until the maximum number of block vector candidates is satisfied, if the number of block vector candidates added to the block vector candidate list using the block vector of the adjacent neighbor block, the history-based block vector, the combined block vector, etc. is less than the maximum number N of block vector candidates. At this time, the fixed base block vector may be a vector (0,0).

When the block vector candidate list is constructed, the maximum number of history-based block vector candidates which may be included in the block vector candidate list may be the maximum number N of block vector candidates or (N−m). m may be an integer greater than 0.

When an upper block is partitioned and each block is encoded/decoded in an intra block copy SKIP mode or an intra block copy MERGE mode, if at least one of the blocks partitioned from the upper block is less than a predetermined threshold, the partitioned blocks may share and use the block vector candidate list constructed in the upper block.

In determination as to whether the block vector candidate list constructed in the upper block is shared, the block vector candidate list constructed in the upper block may be used for the partitioned lower blocks when the following conditions are satisfied using the width and height of the upper block.

Quadtree partitioning: (the width of the upper block x the height of the upper block)/4<threshold Horizontal or vertical binary tree partitioning: (the width of the upper block x the height of the upper block)/2<threshold Ternary tree: (the width of the upper block x the height of the upper block)/4<threshold The threshold may be predetermined in the coder/decoder or signaled from the encoder to the decoder.

Figure 11:
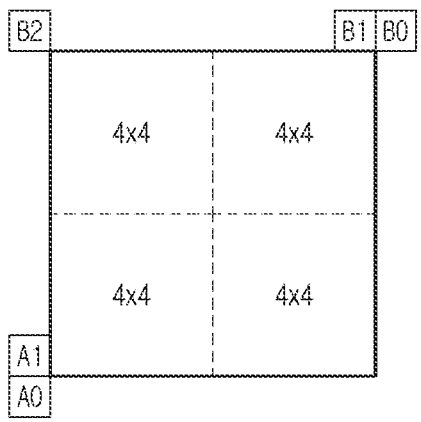
FIG. 11 is a view illustrating a current block partitioned when a predetermined threshold is 32 according to an embodiment of the present invention.
Figure 11:
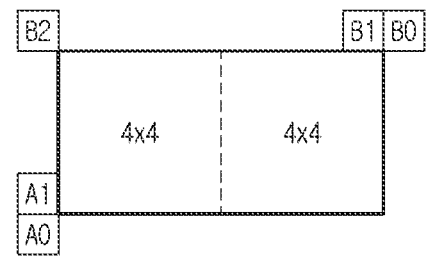
Figure 11:
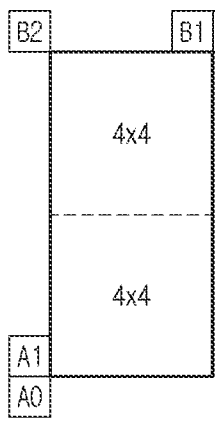
Figure 11:
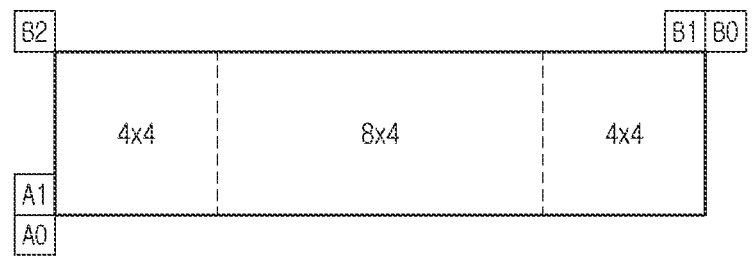

FIG. 11 is a view illustrating a current block partitioned when a predetermined threshold is 32 according to an embodiment of the present invention.

Referring to FIG. 11, if the predetermined conditions are satisfied, then each lower block is encoded/decoded in an intra block copy SKIP mode or an intra block copy MERGE mode. For example, the lower blocks may be encoded/decoded using a block vector candidate list including the block vectors of the neighbor blocks (e.g., A1, B1, B0, A0 and B2) at the upper block position and history-based block vector candidates encoded/decoded before the upper block and stored in the buffer, or fixed base block vectors derived from the width and height of the upper block. Here, the condition may include that whether or not the at least one of area of lower block of the quadtree partitioning, vertical or horizontal binary partitioning, ternary tree partitioning of the upper block is less than 32.

When the block vector candidate list constructed in the upper block is shared and used, a prediction block indicated by the block vector of the lower block may not be located in the upper block.

Figure 12:
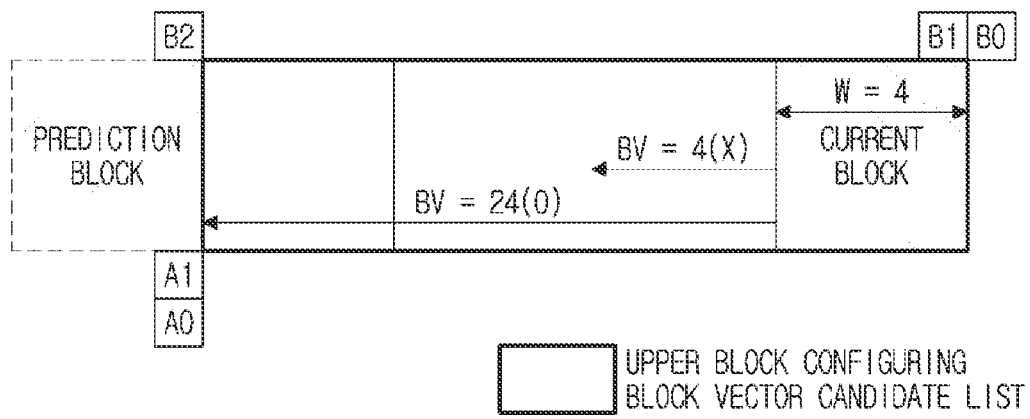
FIG. 12 is a view illustrating a process of sharing and using a block vector candidate list constructed in an upper block according to an embodiment of the present invention.

For example, FIG. 12 is a view illustrating a process of sharing and using a block vector candidate list constructed in an upper block according to an embodiment of the present invention. Referring to FIG. 12, when the block vector candidate list at the upper block position is shared and used, it may be determined that the block vector BV in which at least one of the lower blocks is encoded/decoded in the intra prediction block copy mode is valid only when the prediction block is present in a region encoded/decoded before the upper block.

When the block vector candidate list constructed in the upper block is shared and used, at least one of the partitioned lower blocks may have one of an intra block copy based SKIP mode, an intra block copy based MERGE mode or an intra block copy based AMVP mode.

When the block vector candidate list constructed in the upper block is shared and used, the partitioned lower blocks may be encoded/decoded only in an intra block copy based SKIP mode, an intra block copy based MERGE mode, an intra block copy based AMVP mode or an AMVP mode using a motion vector.

When a merge candidate list constructed in the upper block is shared and used, the partitioned lower blocks may not be encoded/decoded in an intra block copy skip mode and intra block copy MERGE mode. Although the partitioned lower blocks may be encoded/decoded in an intra block AMVP mode, it may be determined that the block vector of the block is valid only when a prediction block acquired from the block vector is present in a region encoded/decoded before the upper block.

The merge candidate list may mean a list including a motion vector and a temporal motion vector, a history-based motion vector, a combined motion vector and a zero vector, not the block vectors of the adjacent neighbor blocks of the upper block.

When the width and/or height of the current block is equal to or less than a predetermined value, an intra prediction block copy SKIP mode and an intra prediction block MERGE mode may not be allowed.

For example, when the width and height of the current block is less than 8, intra block copy based SKIP mode and an intra prediction block MERGE mode may not be allowed.

Alternatively, when the width and height of the current block are equal to or less than a predetermined value, a predetermined vector candidate may not be allowed as a block vector candidate. For example, when the width and height of the current block are equal to or less than 4×4 (or when the product of the width and height of the current block are equal to or less than 16), the block vector of the adjacent neighbor block may not be allowed as a block vector candidate. At this time, at least one of the history-based block vector, the combined block vector or the fixed base block vector may be used to construct the block vector candidate list. For example, only the history-based block vector may be used or only the history-based block vector and the fixed base block vector may be used to construct the block vector candidate list. In addition, at this time, the update process of the history-based block vector candidate list may not be performed.

If the value of the width W×the height H of the current block is less than or equal to the threshold condition in which the merge candidate list constructed in the upper block may be used in the lower block, the intra block copy SKIP mode and the intra block copy MERGE mode may not be allowed.

For example, if the threshold in which the merge candidate list constructed in the upper block may be used in the lower block is 32, the intra block copy SKIP mode and the intra block copy MERGE mode may be allowed only when the width×the height H of the current block is greater than 32.

When the value of the width W×the height H of the current block is less than or equal to the threshold condition in which the block vector candidate list constructed in the upper block may be used in the lower block, the SKIP mode and the MERGE mode may not be allowed. The SKIP mode and the MERGE mode may mean modes encoded/decoded with a motion vector rather than the block vector of the spatial/temporal neighbor block of the current block.

Alternatively, when the width and height of the current block are equal to or less than a predetermined value, a predetermined vector candidate may not be allowed as a block vector candidate. For example, when the width and height of the current block are equal to or less than 4×4 (or when the product of the width and height of the current block are equal to or less than 16), the block vector of the adjacent neighbor block may not be allowed as the block vector candidate. At this time, at least one of the history-based block vector, the combined block vector or the fixed base block vector may be used to construct the block vector candidate list. For example, only the history-based block vector may be used or only the history-based block vector and the fixed base block vector may be used to construct the block vector candidate list. In addition, at this time, the update process of the history-based block vector candidate list may not be performed.

For example, if the threshold condition in which the block vector candidate list constructed in the upper block may be used in the lower block is 32, the SKIP mode and MERGE mode based on the motion vector rather than the block vector may be allowed only when the width×the height H of the current block is greater than 32.

A combined merge candidate list may be composed of motion vectors and block vectors of the adjacent neighbor blocks of the upper block, and, when a value derived based on the width and/or height of at least one of the blocks partitioned from the upper block is less than a predetermined threshold, the combined merge candidate list constructed in the upper block may be shared and used.

A combined merge candidate list may be constructed using at least one of the neighbor block motion vector candidate of the upper block, the block vector candidate of the neighbor block, the temporal motion vector candidate, the history-based motion vector candidate, the history-based block vector candidate, the (0,0) motion vector candidate or the fixed base block vector, and the combined merge candidate list may be shared and used between the lower blocks.

For example, when the block is encoded/decoded in the intra prediction block copy SKIP mode or the intra prediction block MERGE mode, candidates corresponding to the block vector in the combined merge candidate list may be encoded/decoded. At this time, when encoding/decoding is performed in the intra prediction block copy SKIP mode or the intra prediction block MERGE mode, information for identifying the corresponding candidate in the combined merge candidate list may indicate only the block vector candidate.

As another example, when the corresponding block is encoded/decoded in the SKIP mode or the MERGE mode, only candidates corresponding to the motion vector rather than the block vector in the combined merge candidate list may be encoded/decoded. At this time, when encoding/decoding is performed in the SKIP mode or the MERGE mode, information for identifying the corresponding candidate in the combined merge candidate list may indicate only a motion vector candidate.

According to an embodiment, when the current block is a luma component block and is encoded in an intra block copy based AMVP mode, a block vector derivation method is as follows.

Similar to the intra block copy SKIP mode or the MERGE mode, a prediction block vector candidate list may be constructed using a maximum of N prediction block vector candidates. One of the candidates included in the constructed prediction block vector candidate list may be used as the prediction block vector of the current block, and information (e.g., identifier, index, flag, mvp_l0_flag, etc.) for identifying the prediction candidate in the prediction block vector candidate list may be derived based on the encoding parameter transmitted in the bitstream.

A vector difference between the block vector of the current block and the prediction block vector may be calculated and the result of calculation may be entropy-encoded. The decoder may receive block vector difference information in the bitstream or derive the vector difference from the information transmitted in the bitstream and add the block vector difference and the prediction block vector of the current block to derive the block vector of the current block.

One or more candidates of the following may be included in the prediction block vector candidate list.

In FIG. 10, whether the block is encoded/decoded using the intra block copy prediction method in order of A0 and A1 may be determined and the block vector of the block encoded/decoded using the intra block copy prediction method may be determined as a prediction candidate A. Alternatively, whether the block corresponding to A1 is encoded/decoded using the intra block copy prediction method and, when the block is encoded/decoded using the intra block copy prediction method, the block may be determined as the prediction candidate A.

In FIG. 10, whether the block is encoded/decoded using the intra block copy prediction method in order of B0, B1 and B2 may be determined, and the block vector of the block encoded/decoded using the intra block copy prediction method may be determined as a prediction candidate B. Alternatively, whether the block corresponding to B1 is encoded/decoded using the intra block copy prediction method may be determined and, when the block is encoded/decoded using the intra block copy prediction method, the block may be determined as the prediction candidate B.

At this time, the predetermined order of priority of the prediction block vector candidate list may be A and B.

The block vectors of the blocks encoded/decoded before the current block may be stored in a buffer, and one or more of the block vectors stored in the buffer may be determined as the prediction block vector candidate. At this time, the block vector may be stored in a buffer having a specific size in order of encoding/decoding and, if the buffer is filled, the first stored block vector may be deleted and a new (that is, most recently encoded/decoded) block vector may be stored.

The order of priority may be differentiated when the prediction block vector candidate list is constructed in order (e.g., from oldest to newest or from newest to oldest) of the block vectors stored in the buffer. For example, the block vector most recently stored in the buffer may be first included in the prediction block vector candidate list or the block vector first stored in the buffer may be first included in the prediction block vector candidate list. The block vector may be referred to as a history-based block vector candidate.

When the block vector candidate list is constructed using at least one of the history-based block vector candidates, whether the history-based block vector candidate is available in the current block may be determined and, only if available, the candidate may be added to the block vector candidate list. At this time, whether the history-based block vector is available may be determined depending on whether the reference sample (block) at the position indicated by the block vector is available.

When the block vector candidate list is constructed using at least one of the history-based block vector candidates, redundancy check may be performed between the history-based block vector candidate and the block vector candidates present in the block vector candidate list, and, when the same block vector is not present as the result of redundancy check, the corresponding candidate may be added to the block vector candidate list.

For example, when the block vector candidate list is constructed using at least one of the history-based block vector candidates, redundancy check may not be performed between a predetermined candidate among the history-based block vector candidates and the block vector candidates present in the block vector candidate list and the candidate may be added to the block vector candidate list. For example, the predetermined candidate may mean a block vector candidate except for a first candidate among the history-based block vector candidates. Here, the first candidate may mean a first stored or most recently stored block vector candidate in the history-based block vector list composed of the history-based block vector candidates.

As another example, when the block vector candidate list is constructed using at least one of the history-based block vector candidates, redundancy check may be performed between a predetermined candidate among the history-based block vector candidates and the block vector candidates present in the block vector candidate list and the candidate may be added to the block vector candidate list. For example, the predetermined candidate may mean a first candidate among the history-based block vector candidates.

The buffer including the history-based block vector candidates may be maintained during encoding/decoding in units of pictures, slices, tiles, CTUs, CTU rows, CTU columns and may be used in in units of pictures, slices, tiles, CTUs, CTU rows, CTU columns. In addition, the buffer may include at least one of the encoding information of the block encoded/decoded before the current block in units of pictures, slices, tiles, CTUs, CTU rows, CTU columns.

The combined block vector candidate may be constructed using at least two of the block vector candidates present in the block vector candidate list. At this time, when the combined block vector candidate is constructed, the history-based block vector candidate may not be used. At this time, when the combined block vector candidate is constructed, the block vector candidates of the adjacent neighbor blocks may not be used. At this time, whether the combined block vector candidate composed of the block vector candidates is available in the current block may be determined and, only if available, this may be determined as the combined block vector candidate. At this time, whether the block vector is available may be determined depending on whether the reference sample (block) at a position indicated by the block vector is available.

When the width of the current luma block is W and the height of the current luma block is H, $(-(W<<n)+a, -(H<<n)+b)$, $(-(W<<n)+c, 0)$ or $(0, -(H<<n)+d)$ may be included in the block vector candidate list as the block vector candidate. At this time, n may be a positive integer greater than 0 and a, b, c and d may each have an integer value. The block vector candidate may be referred to as a fixed base block vector candidate.

The block vector candidate list may be constructed in predetermined order using at least one of the block vectors of the adjacent neighbor blocks, the history-based block vectors, the combined block vectors or the fixed base block vector candidates.

For example, the block vector candidate list may be constructed in order of the block vectors of the adjacent neighbor blocks, the history-based block vectors, the combined block vectors and the fixed base block vector candidates.

In addition, for example, the fixed base block vector may be constructed in the following order until the number of candidates in the block vector candidate list reaches a maximum number.

1. $(-(W<<1), 0)$
2. $(0, -(H<<1))$
3. $(-(W<<1)-1, 0)$
4. $(0, -(H<<1)-1)$
5. $(-(W<<1)-2, 0)$
6. $(0, -(H<<1)-2)$
7. $(-(W<<1)-3, 0)$
8. $(0, -(H<<1)-3)$
9. $(-(W<<1)-4, 0)$
10. $(0, -(H<<1)-4)$

Alternatively, the fixed base block vector may be a (0,0) vector, and the fixed base block vector may be added to construct the block vector candidate list having a maximum value of candidates until the number of candidates in the block vector candidate list reaches a maximum number. For example, when the number of block vector candidates added to the block vector candidate list using the block vector of the adjacent neighbor block, the history-based block vector, the combined block vector, etc. is less than the maximum number N of block vector candidates, the fixed base block vector may be added to the block vector candidate list until the maximum number of block vector candidates is reached. At this time, the fixed base block vector may be a (0,0) vector.

When the block vector candidate list is constructed, the number of history-based block vector candidates which may be included in the block vector candidate list may be the maximum number N of block vector candidates or (N−m). m may be a natural number greater than 0.

In the intra block copy mode, a range of a value of the block vector or the position of a prediction block obtained using the block vector may be limited. If the range of the value of the block vector or the position of the prediction block obtained using the block vector is not limited, it may be necessary to store the reconstructed images of all regions encoded/decoded before the current block in the same picture in order to generate the prediction block in the intra block copy mode. In this case, when the encoder/decoder is implemented, a memory having large capacity may be required. Accordingly, for ease of implementation, the range of the value of the block vector or the position of the prediction block obtained using the block vector in the intra block copy mode may be limited.

Figure 13:
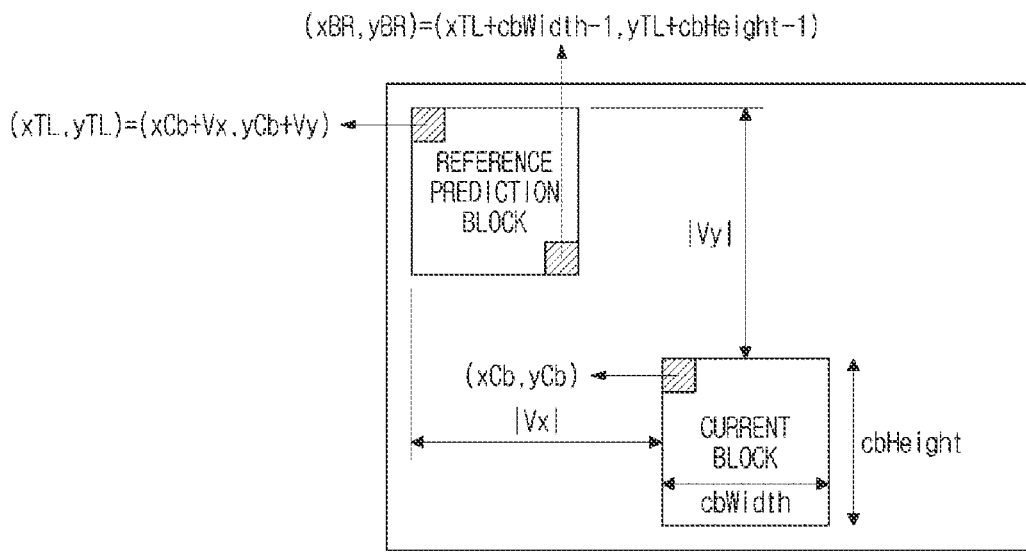
FIG. 13 is a view illustrating a relation between a current block and a reference prediction block according to an embodiment of the present invention.

FIG. 13 is a view illustrating a relation between a current block and a reference prediction block according to an embodiment of the present invention.

Referring to FIG. 13, when the coordinates in the picture of the current block are (xCb, yCb), the width of the current block is cbWidth, the height of the current block is cbHeight and a block vector is (Vx, Vy) in the intra block copy mode, the upper left coordinates (xTL, yTL) of the reference prediction block obtained by applying the block vector may be (xCb+Vx, yCb+Vy) and the right lower coordinates (xBR, yBR) may be (xTL+cbWidth−1, yTL+cbHeight−1).

The method of limiting the range of the value of the block vector or the position of the prediction block obtained using the block vector may be at least one of the following methods.

The block including the upper left coordinates (xTL, yTL) of the reference prediction block and the block including the right lower coordinates (xBR, yBR) shall be available. Here, being available may mean that the block is present or the reconstructed image of the block is present.

The right lower coordinates of the reference prediction block may be located at the left side, the upper side or the upper left side of the upper left coordinates of the current block and a portion in which the current block and the reference prediction block overlaps each other may not occur. To this end, at least one of the following conditions needs to be satisfied.

$$Vx + cb \text{Width} \leq 0$$

$$Vy + cb \text{Height} \leq 0$$

The reference prediction block may be included in the same CTB as the current block or (N−1) CTBs on the left. If a CTB size is 128×128, N may be 2, and, if a CTB size is less than 128×128 or equal to or less than 64×64, the product of the height of the CTB and (N×the width of the CTB) may be equal to 128×128.

Figure 14:
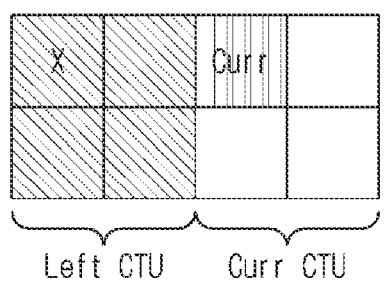
FIG. 14 is a view illustrating a reference prediction block for a current block in an intra block copy mode according to an embodiment of the present invention.
Figure 14:
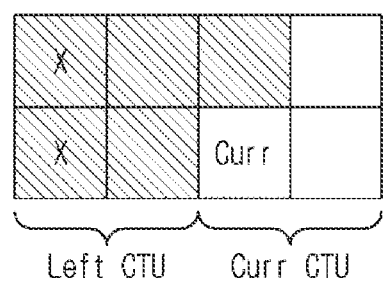
Figure 14:
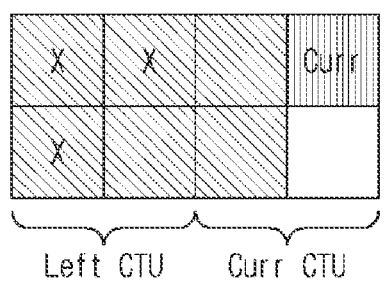
Figure 14:
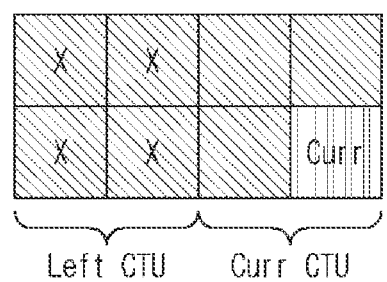

For example, if a CTB size is 128×128, the reference prediction block may be included in the same CTB as the current block and/or the left CTB. When the reference prediction block is included in the same CTB as the current block, this may be included in a region encoded/decoded before the current block. The current CTB and the left CTB of the current CTB are partitioned into four in units of 64×64, such that the reference prediction block may be present in three 64×64 blocks encoded/decoded before a 64×64 block, to which the current block belongs. FIG. 14 is a view illustrating a reference prediction block for a current block in an intra block copy mode according to an embodiment of the present invention. Referring to FIG. 14, the 64×64 blocks, to which the reference prediction block may belong, according to the position of the current block Curr having a size of 64×64 in the CTB are shaded. A region denoted by "x" may mean a region in which the reference prediction block may not be included. In addition, the reference prediction block may be present in the region encoded/decoded before the current block in the CTB, to which the current block belongs. The number of reconstructed samples which need to be stored to generate the reference prediction block may be limited to the number of samples included in a maximum of four 64×64 blocks, that is, a 128×128 block.

As another example, when a CTB size is less than 128×128 or is equal to or less than 64×64, the reference prediction block may be included in (N−1) CTBs on the left of the CTB, to which the current block belongs. The reference prediction block may be included in the same CTB as the current block and/or the left CMB. At this time, N may be an integer in which the product of the height of the CTB and (N×the width of the CTB) satisfies 128×128. For example, when a CTB size is 64×64, N may be 4. In addition, the reference prediction block may be present in the region encoded/decoded before the current block. The number of reconstructed samples which need to be stored to generate the reference prediction block may be limited to the number of samples included in a 128×128 block.

The range of the reference prediction block may be limited by storing the reference prediction region available in the intra block copy mode in an independent buffer.

In this case, the size of an intra block copy reference region buffer may be M1×M2, and may be stored M3 bits per sample. At this time, M1 and M2 may respectively be a positive integers which are multiples of 2 (e.g., 8, 16, 32, 64, 128, etc.) and M3 may be an arbitrary positive integer (e.g., 5, 6, 7, 8, 9, 10, 11, 12, etc.). The values stored in the buffer may be reconstructed image samples, to which loop filtering is not applied, and, when the samples are not expressed M3 bits per sample, the samples may be transformed to M3 bits per sample. The reference region buffer may be newly set for each brick, tile, slice, CTB of the tile group or CTU row. Newly setting may mean that the buffer is reset or initialized. The buffer may be constructed using at least one of the following.

The size of the reference region buffer for the luma component may be a predetermined multiple of the size of the CTB including the current block. Here, the predetermined multiple may be an integer greater than or equal to 1. For example, when the predetermined multiple is 1, the size of the reference region buffer for the luma component may be equal to the size of the CTB, in which the current block is included. For example, when the CTB size is 128×128, the size of the reference region buffer may be 128×128. Alternatively, when the predetermined multiple is 2, the size of the reference region buffer for the luma component may be twice the size of the CTB, in which the current block is included. For example, when the CTB size is 128×128, the size of the reference region buffer may be 256×128.

Alternatively, the size of the reference region buffer may be less than the CTB size.

Figure 15:
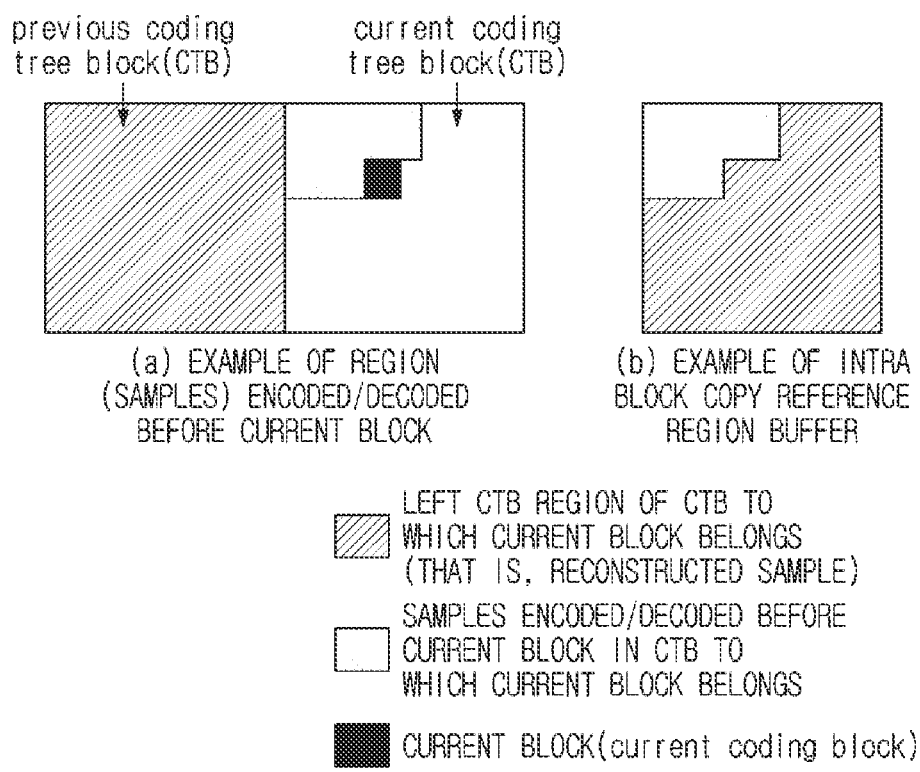
FIG. 15 is a view illustrating a reference region buffer in an intra block copy mode according to an embodiment of the present invention.

FIG. 15 is a view illustrating a reference region buffer in an intra block copy mode according to an embodiment of the present invention. As in the example of (a) of FIG. 15, the reference region buffer shown in the example of (b) of FIG. 15 may be constructed by including the regions encoded/decoded before the current block in the CTB (hereinafter referred to as a "current CTB") in which the current block is included and the region of the CTB located at the left side of the current CTB. The reconstructed samples of the region encoded/decoded before the current block in the current CTB may be included at the same position as the relative position in the CTB. In addition, the reconstructed samples included in the CTB located at the left side of the current CTB may be included, in the reference region buffer, at the position of the current block and the positions corresponding to the regions other than the region encoded/decoded before the current block in the current CTB. At this time, the positions of the reconstructed samples may be included at the same position as the relative positions of the reconstructed samples in the CTB. That is, when the coordinates of the sample are (x, y), the position included in the buffer may mean (x % CTB width or height, y % CTB width or height), (x % M1, y % M2) or (x % M1, y % CTB height). Here, the operation result of the modular operation "%" may always be a positive value. That is, when x is a negative value, x % L may be −(−x % L). For example, when M1, the CTB width or the CTB height is 128, −3%128=125. When the block vector is (Vx, Vy), the position of the prediction sample of the sample located at (x, y) may be ((x+Vx) %128, (y+Vy) %128). At this time, the sample value of the current block region in the reference region buffer may be a reconstructed sample value corresponding to the current block region in the left CTB.

The range of the value of the block vector may be limited such that the transmitted or derived block vector indicates a region included in the reference region buffer.

The range of (Vx, Vy) may be limited to MinVx≤Vx≤MaxVx, MinVy≤Vy≤MaxVy (Vx, Vy) may be limited with respect to the transmitted or derived block vector (Vx, Vy). At this time, MinVx, MaxVx, MinVy and MaxVy may be set to one of the following.

For example, when the upper left coordinates of the reference region buffer are set to (0,0), MinVx=0, MaxVx=(width of the reference region buffer−1), MinVy=0, or MaxVy=(the height of the reference region buffer−1) may be set.

Figure 16:
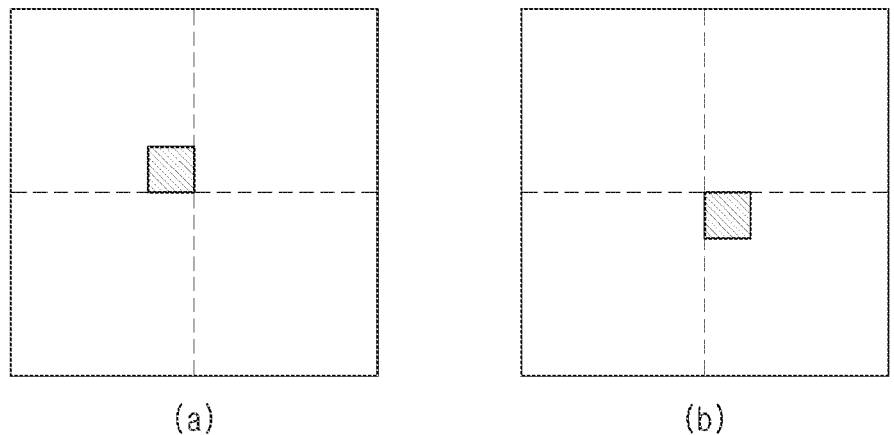
FIG. 16 is a view illustrating a range of a value of a block vector according to an embodiment of the present invention.

As another example, FIG. 16 is a view illustrating a range of a value of a block vector according to an embodiment of the present invention. In the reference region buffer, when the shaded part of (a) of FIG. 16 is set to (0,0), MinVx=−(the width of the reference region buffer/2−1), MaxVx=(the width of the reference region buffer/2), MinVy=−(the height of the reference region buffer/2−1) or MaxVy=(the height of the reference region buffer/2) may be set.

As another example, in the reference region buffer, when the shaded part of (b) of FIG. 16 is set to (0,0), MinVx=−(the width of the reference region buffer/2), MaxVx=(the width of the reference region buffer/2−1), MinVy=−(the height of the reference region buffer/2) or MaxVy=(the height of the reference region buffer/2−1) may be set.

It is possible to easily determine whether an incorrect block vector is transmitted or used, by limiting the range of the value of the block vector in the reference region buffer. When the transmitted or derived block vector is included in a range other than the limited range, at least one of the following methods is applicable in order to include the block vector in the limited range or generate a prediction block.

For example, the block vector may be replaced with a block vector closest to the block vector outside the limited range within the range of the value of the block vector. That is, when the transmitted or derived block vector is (V1x, V1y), V1x=MinVx may be set if V1x<MinVx, V1x=MaxVx may be set if V1x>MaxVx, V1y=MinVy may be set if V1y<MinVy, and V1y=MaxVy may be set if V1y>MaxVy.

As another example, the block vector outside the limited range may be set to have an arbitrary fixed value. For example, (0,0), a vector value indicating the position of the current block, (0, P1), (P2, 0) or (P3, P4) may be set. At this time, P1, P2, P3 and P4 may be arbitrary integer values.

As another example, the sample values of the prediction blocks acquired using the block vector may all be set to an arbitrary fixed value, without replacing the block vector outside the limited range with an arbitrary value. At this time, the arbitrary fixed value is a value from 0 to 2^(bitdepth)−1, and bitdepth may be an arbitrary positive integer value greater than 5. For example, bitdepth may be 5, 6, 7, 8, 9, 10, 11, 12, etc. In addition, for example, the sample values of the prediction block may be 0, 2^(bitdepth−1), 2^(bitdepth)−1, etc.

The reference region buffer may store the reconstructed image sample of the current block at the current block position after the current block is encoded/decoded. This process may be referred to as a reference region buffer updating process, and, after this process is performed, encoding/decoding of a next block may be performed. By gradually updating the sample values included in the reference region buffer, the buffer may be composed of only the reconstructed image samples in the current CTB when encoding/decoding of all the blocks in the current CTB is completed. Alternatively, the buffer may be composed of the reconstructed image samples in the current CTB and the reconstructed image samples in the left CTB, encoding/decoding of which has been completed before the current CTB.

The size of the reference region buffer may be M1=(N× the width of CTB), M2=(the height of the CTB) or M1=(the height of the CTB), M2=(N×the width of CTB). At this time, N may be an arbitrary integer greater than 0 and satisfying M1×M2=128×128. Alternatively, N may be derived to a value satisfying (N×the width of CTB)×(the height of CTB)=2×128×128. The width of the reference region buffer, M1, may be equal to or less than (N×the width of CTB). The height of the reference region buffer, M2, may be equal to the height of the CTB. Alternatively, M1 may be M1=(128/CTB width)×K, where K may be the width of the reference region buffer or a predetermined integer multiple of the CTB width when the CTB width is 128. For example, K may be 128, 256, etc. Here, CTB width may mean the width of the CTB.

For example, when the size of the CTB is 128×128, the size of the reference region buffer may be 256×128. Alternatively, when the size of the CTB is 64×64, the size of the reference region buffer may be 512×64. Alternatively, when the size of the CTB is 32×32, the size of the reference region buffer may be 1024×32.

Figure 17:
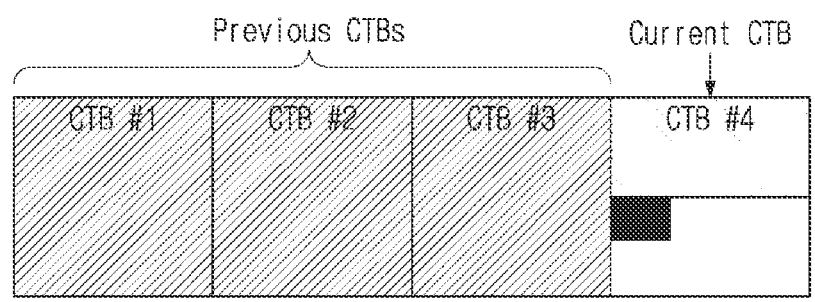
FIG. 17 is a view illustrating a region encoded/decoded before a current block according to an embodiment of the present invention.

FIG. 17 is a view illustrating a region encoded/decoded before a current block according to an embodiment of the present invention.

Referring to FIG. 17, the reference region buffer may be constructed by (N−1) CTBs on the left encoded/decoded before the current CTB. In addition, regions encoded/decoded before the current block in the current CTB may be included in the reference region buffer.

Figure 18:
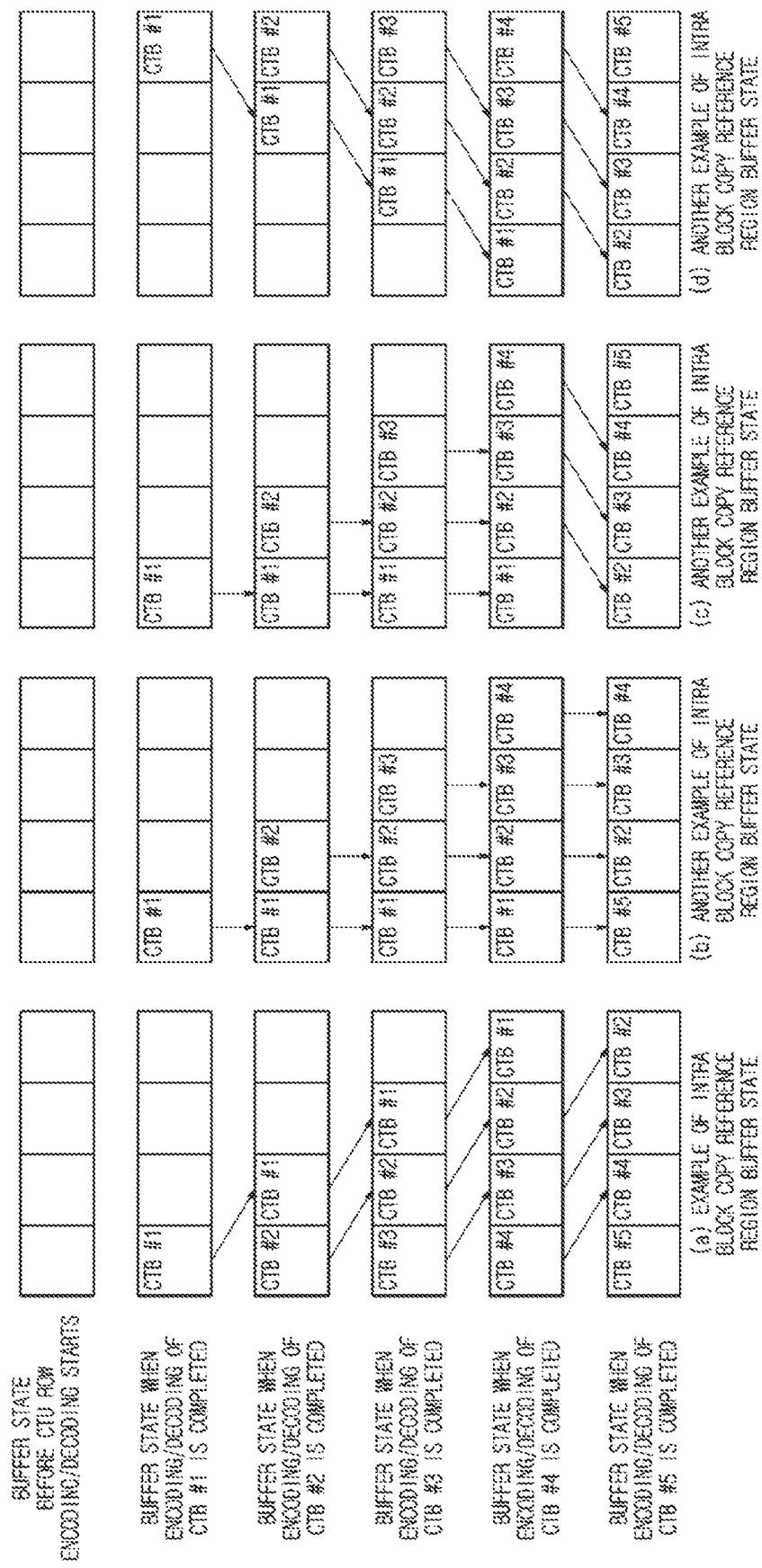
FIG. 18 is a view illustrating a reference region buffer in an intra block copy mode according to another embodiment of the present invention.

FIG. 18 is a view illustrating a reference region buffer in an intra block copy mode according to another embodiment of the present invention.

Referring to FIG. 18, the reference region buffer may be constructed to include (N−1) CTBs on the left encoded/decoded before the current CTB. When CTB #1 is the first CTB of the current CTU row or the CTB row, the buffer before encoding/decoding of CTB #1 starts may be empty or may be set to a predetermined initial value. At this time, the initial value may be an arbitrary integer greater than or equal to −1 or less than or equal to "2^(bitdepth)−1". For example, the initial value may be −1, 0, 2^(bitdepth−1) or 2^(bitdepth)−1.

Here, the buffer being empty may mean that the block vector is limited such that the block vector does not indicate an empty or initialized region in the buffer. In addition, setting the initial value may mean that the block vector is limited such that the block vector does not indicate a region set to the initial value. In addition, the region being indicated may mean that the initial value may be set to a prediction sample value.

When encoding/decoding of CTB #1 is completed, all the reconstructed samples of CTB #1 may be stored in the reference region buffer. When encoding/decoding of CTB #2 is completed, the reconstructed samples of CTB #2 may be additionally stored in the reference region buffer. FIG. 18 may show the state of the reference region buffer after the reconstructed samples are added to the reference region buffer when encoding/decoding of a specific CTB is completed. Referring to (a) of FIG. 18, when encoding/decoding of CTB #2 is completed, the storage position of the samples of CTB #1 may be shifted to the right by the size of one CTB in the reference region buffer, and the reconstructed samples of CTB #2 may be stored at a position where CTB #1 may be stored. Alternatively, referring to (b) of FIG. 18, the reconstructed samples of CTB #2 may be stored in the right region of CTB #1 without changing the storage position of the samples of CTB #1. At this time, when encoding/decoding of CTB #4 is completed, the reference image buffer are filled and, when encoding/decoding of CTB #5 is completed, the reconstructed samples of CTB #5 may be stored at a position where the reconstructed samples of CTB #1 have been stored. Thereafter, the reconstructed samples of CTB #6 may be stored at the storage position of the reconstructed samples of CTB #2. Alternatively, referring to (c) of FIG. 18, the same process as the process of (b) of FIG. 18 may be performed until encoding/decoding of CTB #4 is completed and the reference image buffer is filled, and, when encoding/decoding of CTB #5 is completed, the storage position of the reconstructed samples of CTB #4 may be shifted to the left by the size of one CTB and the reconstructed samples of CTB #5 may be stored at positions where the reconstructed samples of CTB #4 are stored. At this time, the reconstructed samples of CTB #2 and CTB #3 may also be shifted to the left by the size of one CTB. In this case, since the position of the picture between the CTBs and the position in the reference region buffer become equal, the prediction block may be derived using the received block vector without a separate transform process. Referring to (d) of FIG. 18, when encoding/decoding of CTB #2 is completed, the storage position of the samples of CTB #1 in the reference region buffer may be shifted to the left by the size of one CTB and the reconstructed samples may be stored at a position where CTB #1 has been stored. When encoding/decoding of CTB #4 is completed, the reference image buffer is filled and, when encoding/decoding of CTB #5 is completed, as in the process of (c) of FIG. 18, the storage position of the reconstructed samples of CTB #4 may be shifted to the left by the size of one CTB and the reconstructed samples of CTB #5 may be stored at positions where the reconstructed samples of CTB #4 have been stored. At this time, the reconstructed samples of CTB #2 and CB #3 may also be shifted to the left by the size of one CTB.

When a K5-th CTB starts to be encoded/decoded, that is, when a first block of a K5-th CTB starts to be encoded/decoded, the reconstructed samples of (K5−1)-th, (K5−2)-th, . . . , and (K5−N)-th CTBs may be stored in the reference region buffer. For example, when the CTB size is 64×64, N is 4. In this case, the reconstructed samples of (K5−1)-th, (K5−2)-th, (K5−3)-th and (K5−4)-th CTBs may be stored in the reference region buffer. Here, K5 may mean an arbitrary positive integer. The first block of the K5-th CTB may be encoded/decoded by referring to the reference region buffer. The reference region buffer state and the range of the block vector before encoding/decoding of the block starts or after encoding/decoding of the block is completed may be one of the following.

For example, the reconstructed samples of (K5−N)-th CTB may be deleted from the reference region buffer and the reconstructed samples of the first block of the K5-th CTB may be stored in the reference region buffer. The reference region of an A-th block (A being an arbitrary positive integer greater than 1) of the K5-th CTB may be limited to (N−1) CTBs on the left of the current CTB. The limitation may mean that the position indicated by the upper left coordinates (or position) and the right lower coordinates (or position) of the prediction block derived by the block vector are limited to be included in (N−1) CTBs on the left. Here, deleting from the reference region buffer may mean that the region is initialized.

As another example, the reconstructed samples of the (K5−N)-th CTB may be deleted from the reference region buffer, and the reconstructed samples of the first block of the K5-th CTB may be stored in the reference region buffer. The reference region of the A-th block (A being an arbitrary positive integer greater than 1) of the K5-th CTB may be limited to the region of the blocks encoded/decoded before the current block in the current CB and/or (N−1) CTBs on the left of the current CTB. The limitation may mean that the position indicated by the upper left coordinates (or the position) and the right lower coordinates (or the position) of the prediction block derived by the block vector are limited to be included in (N−1) CTBs on the left and/or the block encoded/decoded before the A-th block of the current CTB. In this case, the block vector may be limited to indicate a region which is not initialized in the reference region buffer.

As another example, only samples, the relative positions of which in the CTB correspond to the same position as the first block of the K5-th CTB among the reconstructed samples of the (K5−N)-th CTB may be deleted and the reconstructed samples of the first bock of the K5-th CTB may be stored at the corresponding positions. In this case, the reference region of the current block may be limited to the blocks encoded/decoded before the current block in the current CTB and (N−1) CTBs on the left of the current CTB. The limitation may be advantageous in view of encoding efficiency, because all regions of the reference region buffer are composed of reconstructed samples.

When the K5-th CTB starts to be encoded/decoded, that is, when a first block of a K5-th CTB starts to be encoded/decoded, the reconstructed samples of (K5−1)-th, (K5−2)-th, ..., and (K5−N)-th CTBs may be stored in the reference region buffer. For example, when the CTB size is 64×64, N is 4. In this case, the reconstructed samples of (K5−1)-th, (K5−2)-th and (K5−3)-th CTBs may be stored in the reference region buffer. The blocks in the K5-th CTB may be encoded/decoded by applying one of the following methods.

For example, the reference region of the A-th block (A being an arbitrary positive integer greater than 0) of the K5-th CTB may be limited to (N−1) CTBs on the left of the current CTB. The limitation may mean that the position indicated by the upper left coordinates (or the position) and the right lower coordinates (or the position) of the prediction block derived by the block vector are limited to be included in (N−1) CTB on the left.

As another example, the reference region of the A-th block (A being an arbitrary positive integer greater than 0) of the K5-th CTB may be limited to the region of the blocks encoded/decoded before the current block in the current CTB and/or (N−1) CTBs on the left of the current CTB. The limitation may mean that the position indicated by the upper left coordinates (or the position) and the right lower coordinates (or the position) of the prediction block derived by the block vector are limited to be included in (N−1) CTBs on the left and/or the block encoded/decoded before the A-th block of the current CTB. In this case, the block vector may be limited to indicate a region which is not initialized in the reference region buffer.

Meanwhile, when the first block of the K5-th CTB starts to be encoded/decoded or before encoding/decoding, the CTB region in which the reconstructed sample values of the encoded/decoded block of the K5-th CTB will be stored may be initialized to an arbitrary fixed value or may be empty. At this time, the initial value may be an arbitrary integer greater than or equal to −1 or less than or equal to "2^(bitdepth)−1". For example, the initial value may be −1, 0, 2^(bitdepth−1) or 2^(bitdepth)−1.

Here, the buffer being empty may mean that the block vector is limited such that the block vector does not indicate an empty or initialized region in the buffer. In addition, setting the initial value may mean that the block vector is limited such that the block vector does not indicate a region set to the initial value. In addition, the region being indicated may mean that the initial value may be set to a prediction sample value.

The reconstructed sample values may be stored at the block position set to the initial value or an empty region in the reference region buffer after a specific block in the CTB region is encoded/decoded. Alternatively, a region, which is not encoded/decoded, of the CTB region in the reference region buffer may be empty or may be set to an initial value.

In addition, the reference region buffer may be newly set for each brick, tile, slice, CTB or a tile group or CTU row. Here, newly setting may mean that the buffer is empty or initialized.

When the CTB width is C1, the CTB height is C2 and the current CTB and (N−1) CTBs on the left may be included in the reference region buffer, if the coordinates in the picture of the block included in the CTB are (x, y), the position of the block stored in the reference region buffer may be set as follows.

For example, as shown in (a) of FIG. 18, when the coordinates in the picture of the block included in the K5-th CTB are (x, y), the block may be stored at a position of (x % C1, y % C2). Alternatively, the block may be stored at the position of (x % M1, y % M2), (x % M1, y % CTB height) or (x % M1, y). When the coordinates in the picture of the blocks included in the left CTBs at a point of time when the blocks included in the K5-th CTB are stored are (x1, y1), the position in the reference region buffer may be as follow. The position of the blocks included in the (K5−1)-th CTB may be (x1% C1+C1, y1% C2), the position of the blocks included in the (K5−2)-th CTB may be (x1% C1+(C1x2), y1% C2), and the position of the blocks included in the (K5−3)-th CTB may be (x1% C1+(C1x3), y1% C2). In addition, the position of the blocks included in the (K5−A)-th CTB may be (x1% C1+(C1xA), y1% C2), where A may be 0 or a positive integer of 0≤A≤(N−1).

As another example, in (b) of FIG. 18, when the coordinates in the picture of the block included in the K5-th CTB are (x, y), the block may be stored at a position of (x % C1, y % C2). When the coordinates in the picture of the blocks included in the left CTBs at a point of time when the blocks included in the K5-th CTB are stored are (x1, y1), the position in the reference region buffer may be as follows. The position of the blocks included in the (K5−1)-th CTB may be (x1% C1+(C1x3), y1% C2), the position of the blocks included in the (K5−2)-th CTB may be (x1% C1+

(C1x2), y1% C2), and the position of the block included in the (K5−3)-th CTB may be (x1% C1+(C1x1), y1% C2). In addition, the position of the blocks included in the (K5−A)-th CTB may be (x1% C1+(C1x(N−A)), y1% C2), where A may be 0 or a positive integer of 0≤A≤(N−1).

As another example, in (c) or (d) of FIG. 18, when the coordinates in the picture of the block included in the K5-th CTB are (x, y), the block may be stored at a position of (x % C1+(C1x(N−1)), y % C2). When the coordinates in the picture of the blocks included in the left CTBs at a point of time when the blocks included in the K5-th CTB are stored are (x1, y1), the position in the reference region buffer may be as follows. The position of the blocks included in the (K5−1)-th CTB may be (x1% C1+(C1x(N−2), y1% C2), the position of the blocks included in the (K5−2)-th CTB may be (x1% C1+(C1x(N−3)), y1% C2), and the position of the blocks included in the (K5−3)-th CTB may be (x1% C1+(C1x(N−4)), y1% C2). In addition, the position of the blocks included in the (K5−A)-th CTB may be (x1% C1+(C1x(N−(A+1))), y1% C2), where A may be 0 or a positive integer of 0≤A≤(N−1).

Meanwhile, the block vector may be represented using one of the following methods. In addition, the block vector may be signaled or derived to be represented using one of the following methods.

When the coordinates in the picture of the upper left position of the current block are (x, y) and the coordinates in the picture of the upper left position of the prediction block are (x+VPx, y+VPy), the block vector may be represented by (VPx, VPy) which is a difference between the two coordinates and may be transmitted or information capable of deriving the block vector may be transmitted.

When the coordinates in the reference region buffer of the upper left position of the current block are (x, y) and the coordinates in the reference region buffer of the upper left position of the prediction block are (x+VBx, y+VBy), the block vector may be represented by (VBx, VBy) which is a difference between the two coordinates and may be transmitted or information capable of deriving the block vector may be transmitted.

At this time, when an empty region is present in the reference region buffer, the range of the block vector may be limited such that the prediction block is not included in the corresponding region. For example, the block vector (VBx, VBy) may be limited such that both the upper left coordinates (x+VBx, y+VBy) and the right lower coordinates (x+VBx+cbWidth−1, y+Vby+cbHeight−1) of the prediction block are not included in the empty region of the reference region buffer. The block vector may be limited such that 0≤x+VBx and 0≤y+VBy when the upper left coordinates of the prediction block are (x+VBx, y+VBy) and x+VBx+cbWidth−1<((C1x(N−1))−1) and y+VBy+cbHeight−1≤(C2−1) when the right lower coordinates are (x+VBx+cbWidth−1, y+Vby+cbHeight−1). When up to the region encoded/decoded before the current block in the current CTB may be referred to, the block vector may be limited such that x+VBx+cbWidth−1<x or y+VBy+cbHeight−1<y.

Alternatively, when the reference region is set to an initial value, the range of the block vector may be limited to a range in which the prediction block is included in the reference buffer region. That is, the block vector may be limited such that 0≤x+VBx and 0≤y+VBy when the upper left coordinates of the prediction block are (x+VBx, y+VBy) and x+VBx+cbWidth−1<((C1×N)−1) and y+VBy+cbHeight−1≤(C2−1) when the right lower coordinates are (x+VBx+cbWidth−1, y+Vby+cbHeight−1).

Although the size of the reference region buffer is 128× 128 in the present disclosure, the present disclosure is not limited thereto and the size of the reference region buffer may be variously changed. In addition, various embodiments implemented based on the size of the reference region buffer may be implemented regardless of the size of the reference region buffer. For example, modifications may be made to perform a predetermined method without comparison in the size of the reference region buffer.

Step of deriving the block vector of the chroma component block will be described below.

According to an embodiment, when block partitioning of the luma component and the chroma component is the same in the same CTU (that is, the block partitioning structure of the luma block and the block partitioning structure of the chroma block are the same), and the current block is a chroma component block and is encoded using an intra block copy prediction method, the block vector of the chroma component block may be derived as follows.

The luma component block corresponding to the current chroma component block may be determined as follows.

When the upper left sample position of the current chroma component block is (xc, yc), the width is Wc, and the height is Hc, the upper left sample position of the luma component block corresponding to the current chroma component block may be (xc/K1, yc/K2), the width may be K1×Wc, the height may be K2×Hc. At this time, K1 and K2 may vary according to the chroma component format, and both K1 and K2 may be 2 when the chroma component format to be encoded is a 4:2:0 format and may be 1 when the chroma component format to be encoded is a 4:4:4 format. In addition, in the case of a 4:2:2 format, K1=2 and K2=1.

Since the block partitioning structures of the chroma component block and the luma component block are the same, the luma component block corresponding to the current chroma component block may be composed of one luma component block.

When the block vector of the luma component block corresponding to the chroma component block is (MVL[0], MVL[1]), the block vector of the chroma component block may be (MVL[0]/K1, MVL[1]/K2). Both K1 and K2 may be 2 when the chroma component format of the picture to be encoded is a 4:2:0 format, and may be 1 when the chroma component format of the picture to be encoded is a 4:4:4 format. In addition, in the case of a 4:2:2 format, K1=2 and K2=1. Meanwhile, although it is assumed that the basic unit of MVL[0] and MVL[1] is 1 pixel, the basic unit may be 1/16 pixel or 1/N pixel, where N may be an arbitrary positive integer.

According to an embodiment, block partitioning of the luma component and the chroma component in the same CTU is independently performed (that is, the block partitioning structure of the luma component and the block partitioning structure of the chroma component are different) and the current block is a chroma component block and is encoded using an intra block copy prediction method, the block vector of the chroma component block may be derived as follows.

The luma component region corresponding to the current chroma component block may be determined as follows.

When the upper left sample position of the current chroma component block is (xc, yc), the width is Wc and the height is Hc, the upper left sample position of the luma component block corresponding to the current chroma component block may be (xc/K1, yc/K2), the width may be K1×Wc, and the height may be K2×Hc. At this time, K1 and K2 may vary according to the chroma component format and both K1 and K2 may be 2 when the chroma component format of the picture to be encoded is a 4:2:0 format and may be 1 when the chroma component format of the picture to be encoded is a 4:4:4 format. In addition, in the case of a 4:2:2 format, K1=2 and K2=1.

At this time, the region of the luma component corresponding to the current choma component block may include only a partitioned part of the luma component block. In addition, the luma component region corresponding to the chroma component block may be partitioned into at least one luma component block.

The current chroma component block may be partitioned in units of N×M subblocks and the subblock of the luma component region corresponding to the corresponding subblock may be partitioned in units of (N×K1)×(M×K2) subblocks. At this time, N and M may be integers of 1 or more.

Figure 19:
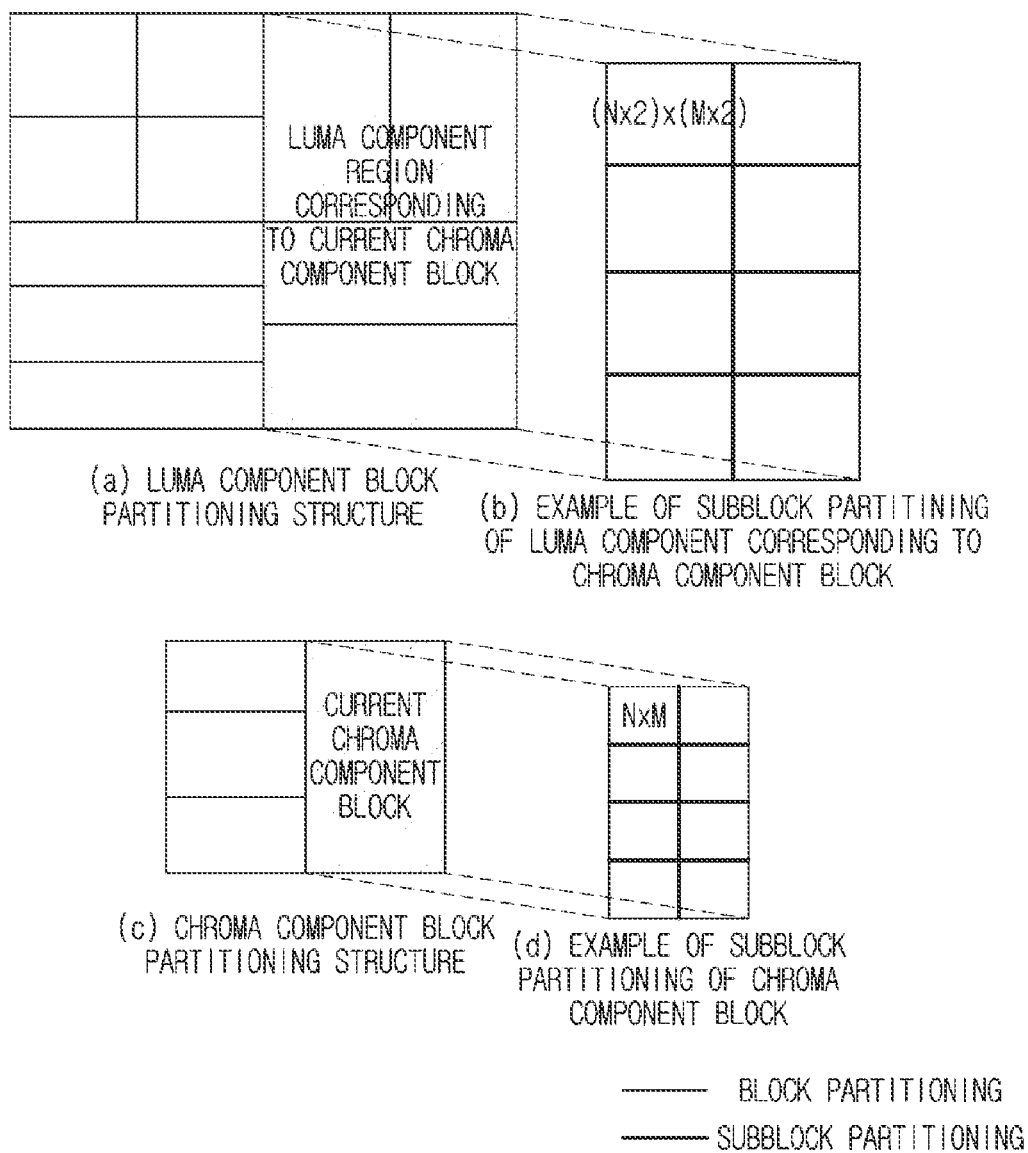
FIG. 19 is a view illustrating a correspondence relation between a chroma component block and a luma component region according to an embodiment of the present invention.

FIG. 19 is a view illustrating a correspondence relation between a chroma component block and a luma component region according to an embodiment of the present invention.

Referring to FIG. 19, an example of a block partitioning structure in an arbitrary CTU having a chroma format of 4:2:0 is shown. The current chroma component block may be partitioned in units of N×M subblocks and the subblock of the luma component region corresponding to the corresponding subblock may be obtained by partitioning the luma component block in units of (N×K1)×(M×K2) subblocks. At this time, N and M may be integers of 1 or more. Alternatively, when the width of the current chroma component block is Wc and the height is Hc, partitioning may be performed in units of N×M subblocks in which the width is partitioned into P1 and the height is partitioned into P2. In this case, N=Wc/P1 and M=Hc/P2, where P1 and P2 may be integers of 1 or more.

There may be a luma component subblock corresponding to the subblock of the current chroma component block. The block vector of the current chroma component subblock may be derived from the block vector of the luma component subblock corresponding thereto. For example, when the block vector of the luma component subblock corresponding to the chroma component subblock is (MVL[0], MVL[1]), the block vector of the chroma component block may be (MVL[0]/K1, MVL[1]/K2). At this time, K1 and K2 may be the same as described above. Meanwhile, although it is assumed that the basic units of MVL[0] and MVL[1] are one pixel in the description, the basic unit may be a 1/16 pixel or a 1/N pixel, where N may be an arbitrary positive integer.

Meanwhile, all the samples located in the luma component subblock corresponding to the subblock of the current chroma component block may not be encoded/decoded using the same prediction method. For example, when the block partitioning structures of the luma component and the chroma component are independent, the luma component subblock corresponding to the chroma component subblock may not match the luma component prediction block or there may be two or more luma component prediction blocks partitioned in the luma component subblock. Here, the luma component prediction block may mean a block, to which the same prediction or transform encoding is applied when the luma component is encoded/decoded and may be determined by luma component block partitioning. Meanwhile, the luma component region corresponding to the chroma component block may not mean a prediction block determined by luma component block partitioning as in the example of FIG. 19 but may mean a luma component region corresponding to the position and size of the chroma component block.

Accordingly, the block vector of the luma component subblock corresponding to the subblock of the current chroma component block may be one of the following.

Figure 20:
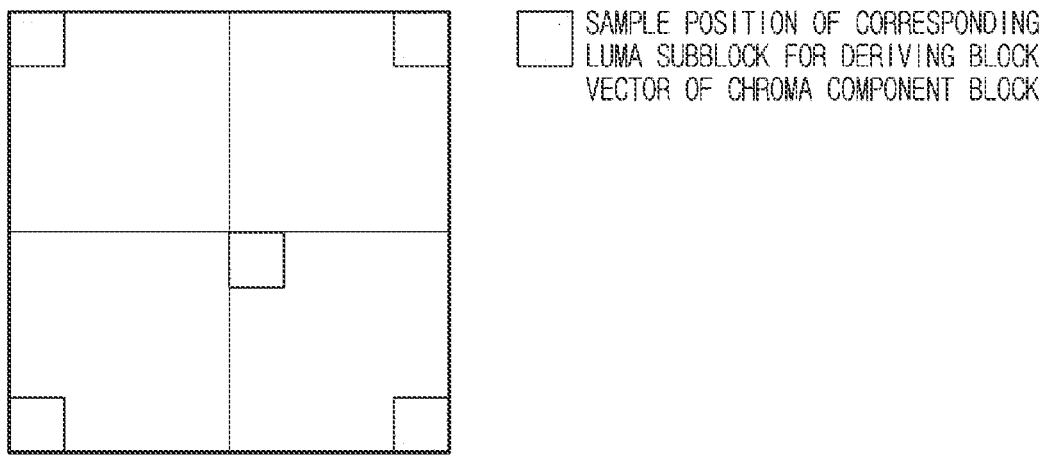
FIG. 20 is a view illustrating a luma component subblock according to an embodiment of the present invention.

1. The block vector of the luma component prediction block when the luma component prediction block including the upper left sample of the luma component subblock corresponding to the subblock of the current chroma component block is encoded/decoded using the intra block copy prediction method 2. The block vector of the luma component prediction block when the luma component prediction block including the center position sample of the luma component subblock corresponding to the subblock of the current chroma component block is encoded/decoded using the intra block copy prediction method 3. FIG. 20 is a view illustrating a luma component subblock according to an embodiment of the present invention. The block vector of the luma component prediction block when the luma component prediction block including one of the shaded sample positions in the luma component subblock corresponding to the subblock of the current chroma component block is encoded/decoded using the intra block copy prediction method as in the example of FIG.

4. The block vector of the luma component prediction block when the luma component prediction block occupying a largest region in the luma component subblock corresponding to the subblock of the current chroma component block is encoded/decoded using the intra block copy prediction method There may be no block vector of the luma component subblock corresponding to the subblock of the current chroma component block in one of the following cases.

1. The case where the luma component prediction block including the upper left sample of the luma component subblock corresponding to the subblock of the current chroma component block is not encoded/decoded using the intra block copy prediction method or is encoded/decoded using the intra prediction method 2. The case where the luma component prediction block including the center position sample of the luma component subblock corresponding to the subblock of the current chroma component block is not encoded/decoded using the intra block copy prediction method or is encoded/decoded using the intra prediction method 3. The case where the luma component prediction block including one of the shaded sample positions in the luma component subblock corresponding to the subblock of the current chroma component block is not encoded/decoded using the intra block copy prediction method or is encoded/decoded using the intra prediction method, as in the example of FIG. 20.

4. The case where the luma component prediction block occupying a largest region in the luma component subblock corresponding to the subblock of the current chroma component block is not encoded/decoded using the intra block copy prediction method or is encoded/decoded using the intra prediction method When there is no block vector of the luma component subblock corresponding to the subblock (hereinafter referred to as a "current subblock") of the current chroma component block, the block vector corresponding to the current chroma component block may be derived using one of the following methods.

The block vector of the current subblock may be set to (0, 0) or (D1, D2). At this time, D1 and D2 may be integers of 0, ±1, ±2, ±3, . . .

The block vector of the current subblock may be set to (Wc+D1, D2) or (D1, Hc+D2). At this time, Wc may be the width of the current chroma component block, Hc may be the height of the current chroma component block, and D1 and D2 may be integers of 0, ±1, ±2, ±3, . . . .

The block vector of the current subblock may be set to one of (−(Wc<<n)+a, −(Hc<<n)+b), (−(Wc<<n)+c, 0) or (0, −(Hc<<n)+d). At this time, n may be a positive integer greater than or equal to 0, and a, b, c and d may have integer values.

The block vector of the neighbor subblock (e.g., at least one of the upper subblock, the lower subblock, the left subblock, the right subblock, the upper left subblock, the upper right subblock, the bottom left subblock or the right lower subblock) of the current subblock may be used as the block vector of the current subblock.

The block vector of the current subblock may be derived using the statistical value of the block vector values of the subblocks, in which the block vector of the corresponding luma component subblock is present, among the subblocks of the current chroma component block.

For example, the block vector of the current subblock may be one of the mean, the media, the maximum value or the minimum value of the block vectors of the subblocks.

As another example, the block vector of the current subblock may be a block vector having a highest frequency of occurrence.

Meanwhile, when the corresponding luma component subblock is not encoded/decoded using the intra block copy prediction method or when there is at least one chroma component subblock in which the block vector of the luma component subblock is not present, the chroma component block may not be encoded/decoded using the intra block copy prediction method.

The prediction mode of the luma component subblock corresponding to the subblock of the current chroma component block may be set as follows. Here, the prediction mode may be intra prediction, inter prediction or intra block copy prediction and, more specifically, may be one of a skip mode, a merge mode, an AMVP mode or an affine skip mode among inter prediction modes or may be an intra block copy skip mode, an intra block copy merge mode or an intra block copy AMVP mode among intra block copy prediction modes.

1. The prediction mode of the luma component prediction block including the upper left sample of the luma component subblock corresponding to the subblock of the current chroma component block 2. The prediction mode of the luma component prediction block including the center position sample of the luma component subblock corresponding to the subblock of the current chroma component block 3. The prediction mode of the luma component prediction block including one of the shaded sample positions in the luma component subblock corresponding to the subblock of the current chroma component block as in the example of FIG. 20

4. The prediction mode of the luma component prediction block occupying a largest region in the luma component subblock corresponding to the subblock of the current chroma component block Hereinafter, step of deriving the prediction signal will be described.

Step of deriving the prediction signal for intra block copy prediction may include at least one of step of deriving the prediction signal of a luma component block and step of deriving the prediction signal of the chroma component block.

Hereinafter, step of deriving the prediction signal of the luma component block will be described.

A block separated from the current luma component block by the block vector of the derived luma component block may be referred to as a prediction block.

For example, when the upper left sample position of the current luma component block is (x0, y0), the width is WL, the height of HL and the block vector of the derived luma component is (xd, yd), a block in which the sample position (x0+xd, y0+yd) separated from the upper left sample position of the current luma component block in the same picture by (xd, yd) is a upper left sample position, the width is WL and the height is HL may be a prediction block. At this time, it may move from (x0, y0) by xd leftward in the horizontal direction if xd is a negative integer, move from (x0, y0) by xd rightward if xd is a positive integer, move from (x0, y0) by yd upward in the vertical direction if yd is a negative integer and move from (x0, y0) by yd downward if yd is a positive integer.

Figure 21:
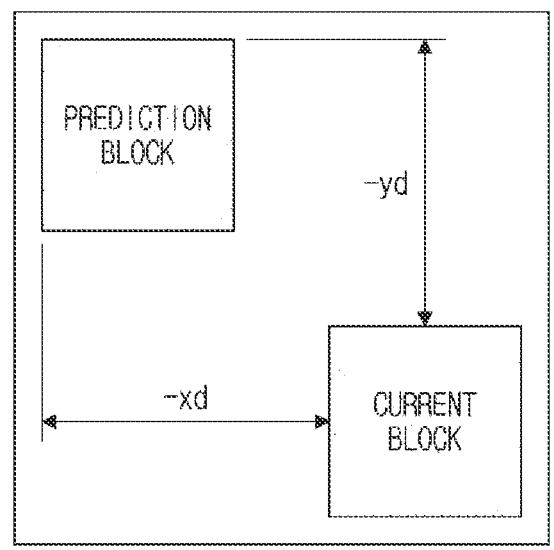
FIG. 21 is a view illustrating a relation between a current block and a prediction block according to an embodiment of the present invention.

FIG. 21 is a view illustrating a relation between a current block and a prediction block according to an embodiment of the present invention.

Referring to FIG. 21, it is assumed that xd and yd are both negative integers.

The sample value of the prediction block may be set to the prediction sample value of the current luma component block and the set value may be referred to as the prediction signal of the current luma component block.

Here, the sample value of the prediction block may be a reconstructed image sample value, to which loop filtering is not applied.

When the block vector is (0,0), a prediction block sample value may be set using a fixed value. Here, the fixed value may be an arbitrary integer value greater than or equal to 0 and less than or equal to "2^(bitdepth)−1" and may be a predetermined value in a range of a reconstructed sample. For example, the fixed value may be 0, 2^(bitdepth−1) or 2^(bitdepth)−1.

The value of the block vector may be limited such that the prediction block is located in a limited region. When the block vector does not have a value in the limited range, the prediction block sample value of the prediction block of the block having the block vector may be set using the fixed value. The fixed value may be set to the same value as the fixed value set when the block vector is (0, 0).

In addition, when encoding/decoding is performed by applying the reference region buffer, a block separated from the current block position by the block vector in the reference region buffer may be referred to as a prediction block. The prediction block may be included in the reference region buffer.

When the coordinates in the picture of the sample in the current block are (x, y) and the block vector is (Vx, Vy), the position of the corresponding prediction sample in the prediction block in the reference region buffer may be ((x+Vx) % M1, (y+Vy) % M2) or ((x+Vx) % M1, (y+Vy)).

Hereinafter, step of deriving the prediction signal of the chroma component block will be described.

According to an embodiment, when block partitioning of the luma component and the chroma component in the same CTU is equally performed (that is, the block partitioning structure of the luma component and the block partitioning structure of the chroma component are the same) and the current block is a chroma component block and is encoded using the intra block copy prediction method, the prediction signal of the chroma component block may be derived as follows.

A block separated from the current chroma component block by the block vector the derived chroma component block may be referred to as a prediction block.

For example, when the upper left sample position of the current chroma component block is (x0, y0), the width is Wc, the height of Hc and the block vector of the derived chroma component is (xd, yd), a block in which the sample position (x0+xd, y0+yd) separated from the upper left sample position of the current chroma component block in the same picture by (xd, yd) is a upper left sample position, the width is Wc and the height is Hc may be a prediction block. At this time, it may move from x0 by xd rightward in the horizontal direction if xd is a positive integer, move from x0 by xd leftward if xd is a negative integer, move from y0 by yd downward in the vertical direction if yd is a positive integer and move from y0 by yd upward if yd is a negative integer.

The sample value of the prediction block may be set as the prediction sample value of the current chroma component block, and the set value may be referred to as the prediction signal of the current chroma component block.

According to an embodiment, when block partitioning of the luma component and the chroma component in the same CTU is independently performed (that is, the block partitioning structure of the luma component and the block partitioning structure of the chroma component are different) and the current block is a chroma component block and is encoded using the intra block copy prediction method, the prediction signal of the chroma component block may be derived as follows.

A subblock prediction signal may be derived in subblock units using the block vector derived in units of the subblocks of the current chroma component block.

A block separated from the subblock of the current chroma component block by the block vector of the subblock of the derived chroma component may be referred to as a prediction subblock.

For example, when the upper left sample position of the subblock of the current chroma component block is (sx0, sy0), the width is SWc, the height is SHc and the block vector of the derived chroma component is (Sxd, Syd), a block in which the sample position (sx0+Sxd, sy0+Syd) separated from the upper left sample position of the subblock in the current chroma component block in the same picture by (xd, yd) is a upper left sample position, a width is SWc and a height of SHc may be a prediction subblock.

The sample value of the prediction subblock may be set as the prediction sample value of the current chroma component subblock and the set value may be referred to as the prediction signal of the current chroma component subblock.

The prediction signal of the current chroma component block may be constructed using the subblock prediction signals of all subblocks included in the current chroma component block.

Hereinafter, step of deriving the residual signal will be described.

In general, when a residual signal is present, the residual signal may be transformed and encoded in an encoding process and may be included and transmitted in a bitstream, and the inverse process of the transform encoding process may be performed in a decoding process to derive the residual signal.

Identifier information indicating presence/absence of residual signal related signal (e.g., a quantization transform coefficient (or a quantized transform coefficient), etc.) included in the bitstream and transmitted to the decoder may include at least one of the following.

cu_cbf: When the luma component and the chroma component have the same block partitioning structure, this may mean information on presence/absence of the quantization transform coefficient of the residual signal of the luma component block and the quantization transform coefficient of the residual signal of the chroma component block in the coding block CU. When the luma component and the chroma component have independent block partitioning structures, this may mean information on presence/absence of the quantization transform coefficient of the residual signal of the luma component block (or the luma component block in the coding block CU) or the chroma component block (or the chroma component block in the coding block CU). The information on presence/absence of the quantization transform coefficient of the residual signal having a first value of 1 may mean that the quantization transform coefficient of the residual signal of the blocks is present and the information on presence/absence of the quantization transform coefficient of the residual signal having a second value of 0 may mean that the quantization transform coefficient of the residual signal of the blocks is not present. When the luma component and the chroma component have the same block partitioning structure, if any one of the luma component block and the chroma component (Cb, Cr) block has a quantization transform coefficient of a residual signal, the information on presence/absence of the quantization transform coefficient of the residual signal may have the first value and, if there is no quantization transform coefficient of a residual signal for all components, the information on presence/absence of the quantization transform coefficient of the residual signal may have the second value. Here, the luma component block and the chroma component block may mean the luma component block in the coding block CU and the chroma component block in the coding block CU.

tu_cbf_luma: This may mean presence/absence of the quantization transform coefficient of the residual signal of the luma component block. Information on presence/absence of the quantization transform coefficient of the residual signal of the luma component block having a first value of 1 may mean that the quantization transform coefficient of the residual signal of the luma block is present and the information on presence/absence of the quantization transform coefficient of the residual signal of the luma component block having a second value of 0 may mean that the quantization transform coefficient of the residual signal of the luma block is not present. Here, the luma component block may mean the luma component block in the transform block TU.

tu_cbf_cr, tu_cbf_cb: This may mean presence/absence of the quantization transform coefficient of the residual signal of each of Cr and Cb of the chroma component. Information on presence/absence of the quantization transform coefficient of the residual signal of the chroma component (Cr or Cb) block having a first value of 1 may mean that the quantization transform coefficient of the residual signal of the chroma component (Cr or Cb) block is present and the information on presence/absence of the quantization transform coefficient of the residual signal of the chroma component (Cr or Cb) block having a second value of 0 may mean that the quantization transform coefficient of the residual signal of the chroma component (Cr or Cb) block is not present. Here, the chroma component block may mean the chroma component block in the transform block Tu.

Meanwhile, in the following embodiments, the luma component block and the chroma component block related to cu_cbf may mean the luma component block in the coding block CU and the chroma component block in the coding block CU, respectively. In addition, the luma component block related to tu_cbf_luma may mean the luma component block in the transform block TU. In addition, the chroma component block related to tu_cbf_cr and tu_cbf_cb may mean the chroma component block in the transform block TU.

In general, only when cu_cbf has a first value of 1, at least one of tu_cbf_luma, tu_cbf_cr or tu_cbf_cb may be further transmitted to indicate presence/absence of the quantization transform coefficients of the residual signals of the luma component, Cr of the chroma component and Cb of the chroma component.

When the luma component and the chroma component have independent block partitioning structures, cu_cbf may have the same information as tu_cbf_luma.

In the CTU to be currently encoded, when the block partitioning structures of the luma component and the chroma component are the same and the current luma component block is in an intra block copy SKIP mode, the residual signals of the current luma component block and the chroma component block may be derived as follows.

When the current luma component block is in an intra block copy SKIP mode, there is no residual signal as in the SKIP mode of general inter prediction. In this case, all residual signals may be set to have a value of 0.

In the current chroma component block, when the corresponding luma component block is in an intra block copy SKIP mode, there is no residual signal as in the luma component block. In this case, all residual signals may be set to have a value of 0.

In the case of the intra block copy SKIP mode, information for identifying presence of the residual signal (e.g., (an identifier, a flag, an index, cu_cbf, tu_cbf_luma, tu_cbf_cr, tu_cbf_cb, etc.) may not be transmitted in a bitstream.

For example, a cu_cbf value indicating whether all the quantization transform coefficients of the residual signals of the luma component, Cr of the chroma component and Cb of the chroma component are present may not be transmitted in the bitstream and may be set to a second value indicating that all the quantization transform coefficients of the residual signals of the luma component, Cr of the chroma component and Cb of the chroma component are not present in the decoding process. All tu_cbf_luma indicating presence/absence of the quantization transform coefficient of the residual signal of the luma component, tu_cbf_cr indicating presence/absence of the quantization transform coefficient of the residual signal of the Cr component of the chroma component, tu_cbf_cb indicating presence/absence of the quantization transform coefficient of the residual signal of the Cb component of the chroma component are not transmitted and are set to the second value in the decoding process to indicate that the quantization transform coefficients of the residual signals corresponding thereto are not present.

In CTU to be currently encoded, when the block partitioning structures of the luma component and the chroma component are the same and the current luma component block is in an intra block copy MERGE mode, the residual signals of the current luma component block and the chroma component block may be derived as follows.

When the current luma component block is in an intra block copy MERGE mode, the residual signal may always be present. In this case, the quantization transform coefficient of the residual signal transformed and encoded in the encoding process may be included and transmitted in the bitstream and the residual signal may be derived by inverse transform encoding in the decoding process.

In the current chroma component block, when the corresponding luma component block is in an intra block copy MERGE mode, a residual signal may be present as in the luma component block. In this case, the quantization transform coefficient of the residual signal transformed and encoded in the encoding process may be included and transmitted in the bitstream and the residual signal may be derived by inverse transform encoding in the decoding process.

In the case of the intra block copy based MERGE mode, information (e.g., an identifier, a flag, an index, cu_cbf, etc.) for identifying presence/absence of the residual signal may not be transmitted in the bitstream. In the MERGE mode, since the residual signal is always present, a cu_cbf value indicating whether any one of the quantization transform coefficients of the residual signals of the luma component, Cr of the chroma component and Cb of the chroma component is present may also be set to the first value in the decoding process. In this case, the information for identifying presence/absence of the residual signal may not be transmitted in the bitstream and the quantization transform coefficient information of the residual signal may always be included and transmitted.

However, in the case of the intra block copy MERGE mode, since there may be a component without the quantization transform coefficient of the residual among the luma component, Cr of the chroma component and Cb of the chroma component, identifiers (e.g., tu_cbf_luma in the case of the luma component and tu_cbf_cr and tu_cbf_cb in the case of the chroma component) indicating presence/absence of the quantization transform coefficient of the residual signal of each component may be included and transmitted in the bitstream.

In the CTU to be currently encoded, the block partitioning structures of the luma component and the chroma component are the same and the current luma component block is in an intra block copy AMVP mode, the residual signals of the current luma component block and the chroma component block may be derived as follows.

When the current luma component block is in the intra block copy AMVP mode, the residual signal may or may not be present. In this case, information for identifying presence/absence of the residual signal may always be transmitted in the bitstream. When the residual signal is present, the quantization transform coefficient of the residual signal transformed and encoded in the encoding process may be included and transmitted in the bitstream and the residual signal may be derived by inverse transform encoding in the decoding process. When the residual signal is not present, all residual signals may be set to have a value of 0.

In the current chroma component block, when the corresponding luma component block is in an intra block copy AMVP mode, a residual signal may or may not be present as in the luma component block. When the residual signal is present, the quantization transform coefficient of the residual signal transformed and encoded in the encoding process may be included and transmitted in the bitstream and the residual signal may be derived by inverse transform encoding in the decoding process. When the residual signal is not present, all residual signals may be set to have a value of 0.

In the case of intra block copy AMVP mode, since the quantization transform coefficients of the residual signals of the luma component, Cr of the chroma component and Cb of the chroma component may or may not be present, information (e.g., an identifier, a flag, an index, cu_cbf, etc.) for identifying presence/absence of the residual signal indicating whether the quantization transform coefficients of the residual signals of the luma component, Cr of the chroma component and Cb of the chroma component is present may always be included and transmitted in the bitstream.

In addition, when information (e.g., an identifier, a flag, an index, cu_cbf, etc.) for identifying presence/absence of a residual signal indicating whether the quantization transform coefficients of the residual signals of the luma component, Cr of the chroma component and Cb of the chroma component are present has a first value indicting presence of the residual signal, since there may be a component without the quantization transform coefficient of the residual signal among the luma component, Cr of the chroma component and Cb of the chroma component, identifiers (e.g., tu_cbf_luma in the case of the luma component and tu_cbf_cr and tu_cbf_cb in the chroma component) indicating presence/absence of the quantization transform coefficient of the residual signal of each component may be included and transmitted in the bitstream.

In the CTU to be currently encoded, when block partitioning of the luma component and the chroma component is independent and the current luma component block is in an intra block copy SKIP mode, the residual signal of the current luma component block may not be present as in the SKIP mode of general intra prediction. In this case, all residual signals may be set to have a value of 0 and information (e.g., an identifier, a flag, an index, cu_cb, tu_cbf_luma, etc.) for identifying presence/absence of the residual signal may not be transmitted in the bitstream.

When the luma component block is in an intra block copy SKIP mode, cu_cbf transmitted for the luma component block in an independent partitioning structure may indicate whether the quantization transform coefficient of the residual signal of the luma component block is present. In this case, since the quantization transform coefficient of the residual signal of the luma component block is always not present, the information may not be transmitted in the bitstream and may be set to a second value of 0 in the decoding process.

In addition, identification information (e.g., tu_cbf_luma) indicating presence/absence of the residual signal of the luma component may not be transmitted in the bitstream and may be set to a second value of 0 in the decoding process.

In the CTU to be current encoded, when block partitioning of the luma component and the chroma component is independent and the current luma component block is in an intra block copy MERGE mode, the residual signal of the current luma component block may always be present as in MERGE mode of general intra prediction. In this case, the quantization transform coefficient of the residual signal transformed and encoded in the encoding process may be included and transmitted in the bitstream and the residual signal may be derived by inverse transform encoding in the decoding process.

When the luma component block is in an intra block copy MERGE mode, cu_cbf transmitted for the luma component block in an independent partitioning structure may indicate only whether the quantization transform coefficient of the residual signal of the luma component block is present. In this case, since the quantization transform coefficient of the residual signal of the luma component block is always present, the information may not be transmitted in the bitstream and may be set to a first value of 1 in the decoding process.

Meanwhile, identification information (e.g., tu_cbf_luma) indicating presence/absence of the residual signal of the luma component has the same value as cu_cbf transmitted for the luma component block in the independent partitioning structure and thus may not be transmitted in the bitstream and may be set to a first value of 1 in the decoding process.

In the CTU to be currently encoded, when block partitioning of the luma component and the chroma component is independent and the current luma component block is in an intra block copy AMVP mode, the residual signal of the current luma component block may or may not be present as in the AMVP mode of general intra prediction. When the residual signal of the current luma component block is present, the quantization transform coefficient of the residual signal transformed and encoded in the encoding process may be included and transmitted in the bitstream and the residual signal may be derived by inverse transform encoding in the decoding process. When the residual signal is not present, all residual signals may be set to have a value of 0.

When the luma component block is in an intra block copy AMVP mode, cu_cbf transmitted for the luma component block in an independent partitioning structure may indicate only whether the quantization transform coefficient of the residual signal of the luma component block is present. In this case, since the quantization transform coefficient of the residual signal of the luma component block may or may not be present, cu_cbf which is information for identifying whether the residual signal is present may always be transmitted in the bitstream.

Meanwhile, identification information (e.g., tu_cbf_luma) indicating presence/absence of the residual signal of the luma signal in the transform unit TU has the same value as cu_cbf transmitted for the luma component block in the coding block CU in the independent partitioning structure and thus may not be transmitted in the bitstream and may be set to the same value as cu_cbf in the decoding process. That is, it is possible to increase encoding/decoding efficiency by removing redundancy of signaling of both cu_cbf and tu_cbf_luma. For example, in the independent partitioning structure, when he prediction mode of the current luma component block is an intra block copy mode, tu_cbf_luma may not be signaled. At this time, a tu_cbf_luma value which is not signaled may be set to a cu_cbf value.

Whether a residual signal is present may be determined according to the value of cu_cbf or tu_cbf_luma. For example, when cu_cbf or tu_cbf_luma has a first value, it may be determined that the residual signal is present.

When block partitioning of the luma component and the chroma component are independently performed in the same CTU (that is, the block partitioning structure of the luma component is different from that of the chroma component), and the current block is a chroma component block and is encoded using the intra block copy prediction method, the residual signal of the chroma component block may be derived as follows.

All subblocks included in the luma component block corresponding to the current chroma component block may have the same intra block copy prediction encoding mode.

At this time, the intra block copy prediction encoding mode may be an intra block copy SKIP mode, an intra block copy MERGE mode or an intra block copy AMVP mode.

FIG. 22 is a view illustrating when prediction encoding modes of luma component subblocks corresponding to chroma component blocks according to an embodiment of the present invention are the same. For example, as in the example of FIG. 22, all prediction encoding modes of the luma component subblocks may be intra block copy SKIP modes, intra block copy MERGE modes or intra block copy AMVP modes.

When all the subblocks included in the luma component block corresponding to the current chroma component block are in the same intra block copy prediction mode, whether the residual signal of the corresponding chroma component block is encoded/decoded may be determined based on the intra block copy prediction mode of the corresponding luma component blocks.

For example, when all the subblocks included in the luma component block corresponding to the current chroma component block are in the intra block copy SKIP mode, as in the case where the luma component block is in an intra block copy SKIP mode, the residual signal of the chroma component block may not be encoded/decoded and residual signal information may not be transmitted. In this case, all residual signals may be set to have a value of 0.

At this time, information (e.g., an identifier, a flag, cu_cbf, tu_cbf_cr/tu_cbf_cb, etc.) for identifying presence/absence of the residual signal of the block may not be sent. The information for identifying presence/absence of the residual signal, which has a first value, may indicate that the residual signal is present and the information having a second value may indicate that the residual signal is not present. When the chroma component block is in an intra block copy SKIP mode, the information for identifying presence/absence of the residual signal of the corresponding block may always be set to a second value in the decoding process.

As another example, when all subblocks included in the luma component block corresponding to the current chroma component block are in an intra block copy MERGE mode, as in the case where the luma component block is in the intra block copy MERGE mode, the chroma component block may always have a residual signal. In this case, the quantization transform coefficient of the residual signal transformed and encoded in the encoding process may be included and transmitted in the bitstream and the residual signal may be derived by inverse transform encoding in the decoding process.

Information (e.g., an identifier, a flag, cu_cbf, etc.) for identifying presence/absence of the residual signal transmitted for the chroma component block in the independent partitioning structure may indicate whether the quantization transform coefficient of the residual signal is present in at least one of the Cb and Cr blocks of the chroma component.

In the case of the intra block copy MERGE mode, information (e.g., an identifier, a flag, an index, cu_cbf, etc.) for identifying presence/absence of the residual signal may not be transmitted in the bitstream. In the MERGE mode, since the residual signal is always present, the cu_cbf value indicating whether any one of the quantization transform coefficients of the residual signals of Cr of the chroma component and Cb of the chroma component is present may always be set to a first value in the decoding process.

However, in the case of an intra block copy MERGE mode, since there may be a component without the quantization transform coefficient of the residual signal between Cr of the chroma component and Cb of the chroma component, identifiers (e.g., tu_cbf_cr, tu_cbf_cb) indicating presence/absence of the quantization transform coefficient of the residual signal of each chroma component may be included and transmitted in the bitstream.

As another example, when all subblocks included in the luma component block corresponding to the current chroma component block are in an intra block copy AMVP mode, as in the case where the luma component block is in an intra block copy AMVP mode, the chroma component block may or may not have a residual signal. In this case, information for identifying presence/absence of the residual may always be transmitted in the bitstream. When the residual signal component block is present, the quantization transform coefficient of the residual signal transformed and encoded in the encoding process may be included and transmitted in the bitstream and the residual signal may be derived by inverse transform encoding in the decoding process. When the residual signal is not present, all residual signals may be set to have a value of 0.

Information (e.g., an identifier, a flag, cu_cbf, etc.) for identifying presence/absence of the residual signal transmitted for the chroma component block in the independent partitioning structure may indicate whether the quantization transform coefficient of the residual signal is present in at least one of the Cb and Cr blocks of the chroma component.

In the case of the intra block copy AMVP mode, since the quantization transform coefficients of the residual signals of Cr of the chroma component and Cb of the chroma component may or may not be present, information (e.g., an identifier, a flag, an index, cu_cbf, etc.) for identifying presence/absence of the residual signals of Cr of the chroma component and Cb of the chroma component may always be included and transmitted in the bitstream.

In addition, when the information (e.g., an identifier, a flag, an index, cu_cbf, etc.) for identifying presence/absence of the residual signals of Cr of the chroma component and Cb of the chroma component has a first value indicating that the residual signal is present, since there may be a component without the quantization transform coefficient of the residual signal between Cr of the chroma component and Cb of the chroma component, identifiers (e.g., tu_cbf_cr or tu_cbf_cb in the case of the chroma component) indicating presence/absence of the quantization transform coefficient of the residual signal of each component may be included and transmitted in the bitstream. When the identifier (e.g., tu_cbf_cr) indicating presence of the quantization transform coefficient of the residual signal of Cr of the chroma component has a first value, the quantization transform coefficient information of the residual signal for the Cr component may be included and transmitted in the bitstream. When the identifier (e.g., tu_cbf_cb) indicating presence of the quantization transform coefficient of the residual signal of Cb of the chroma component has a first value, the quantization transform coefficient information of the residual signal for the Cb component may be included and transmitted in the bitstream.

As another example, even if all subblocks included in the luma component block corresponding to the current chroma component block are in the same intra block copy prediction mode (e.g., an intra block copy SKIP mode, an intra block copy MERGE mode, an intra block copy AMVP mode, etc.), since all samples included in the corresponding luma component block are not in the same intra block copy prediction mode, it may not be efficient to encode the residual signal according to the mode of the luma component block corresponding to the chroma component block.

Accordingly, when the chroma component block is in an intra block copy mode, regardless of the type of the mode of the subblock included in the corresponding luma component block, information (e.g., an identifier, a flag, an index, cu_cbf, etc.) for identifying presence/absence of the quantization transform coefficients of the residual signals of Cr of the chroma component and Cb of the chroma component may always be included and transmitted in the bitstream.

In addition, when the information (e.g., an identifier, a flag, an index, cu_cbf, etc.) for identifying presence/absence of the quantization transform coefficients of the residual signals of Cr of the chroma component and Cb of the chroma component has a first value indicating that the residual signal is present, since there may be a component without the quantization transform coefficient of the residual signal between Cr of the chroma component and Cb of the chroma component, identifiers (e.g., tu_cbf_cr or tu_cbf_cb in the case of the chroma component) indicating presence/absence of the quantization transform coefficient of the residual signal of each component may be included and transmitted in the bitstream. When the identifier (e.g., tu_cbf_cr) indicating that the quantization transform coefficient of the residual signal of Cr of the chroma component has a first value, the quantization transform coefficient information of the residual signal of the Cr component may be included and transmitted in the bitstream. When the identifier (e.g., tu_cbf_cb) indicating presence of the quantization transform coefficient of the residual signal of Cb of the chroma component has a first value, the quantization transform coefficient information of the residual signal of the Cb component may be included and transmitted in the bitstream and the residual signal may be derived by inverse transform encoding in the decoding process. When absence of the residual signal of the chroma component block is identified, the quantization transform coefficient information of the residual signal of the chroma component block may not be transmitted and all residual signals may be set to have a value of 0.

As another example, when the current chroma component block is in an intra block copy prediction mode or when all subblocks included in the luma component block corresponding to the current chroma component block are in an intra block copy prediction mode, the subblocks of the luma component corresponding to the chroma component block may be in different intra block copy prediction encoding modes (e.g., an intra block copy SKIP mode, an intra block copy MERGE mode and an intra block copy AMVP mode). FIG. 23 is a view illustrating when prediction encoding modes of luma component subblocks corresponding to chroma component blocks according to an embodiment of the present invention are different. For example, as in the example of FIG. 23, at least two of the intra block copy SKIP mode, the intra block copy MERGE mode and intra block copy AMVP mode may be present in the corresponding luma component block.

At this time, regardless of the type of the mode of the subblock included in the corresponding luma component block, information (e.g., an identifier, a flag, an index, cu_cbf, etc.) for identifying presence/absence of the quantization transform coefficients of the residual signals of Cr of the chroma component and Cb of the chroma component may always be included and transmitted in the bitstream.

In addition, when the information (e.g., an identifier, a flag, an index, cu_cbf, etc.) for identifying presence/absence of the quantization transform coefficients of the residual signals of Cr of the chroma component and Cb of the chroma component has a first value indicating that the residual signal is present, since there may be a component without the quantization transform coefficient of the residual signal between Cr of the chroma component and Cb of the chroma component, identifiers (e.g., tu_cbf_cr, tu_cbf_cb in the case of the chroma component) indicating presence/absence of the quantization transform coefficient of the residual signal of each component may be included and transmitted in the bitstream. When the identifier (e.g., tu_cbf_cr) indicating presence of the quantization transform coefficient of the residual signal of Cr of the chroma component has a first value, the quantization transform coefficient information of the residual signal for the Cr component may be included and transmitted in the bitstream. When the identifier (e.g., tu_cbf_cb) indicating presence of the quantization transform coefficient of the residual signal of Cb of the chroma component has a first value, the quantization transform coefficient information of the residual signal of the Cb component may be included and transmitted in the bitstream and the residual signal may be derived by inverse transform encoding in the decoding process. When absence of the residual signal of the chroma component block is identified, the quantization transform coefficient information of the residual signal of the chroma component block may not be transmitted and all residual signals may be set to have a value of 0.

Hereinafter, step of constructing the reconstructed signal will be described.

In the current luma component block, the reconstructed signal may be constructed by adding the residual signal of the luma component block to the prediction signal of the luma component block.

In the current chroma component block, the reconstructed signal may be constructed by adding the residual signal of the chroma component block to the prediction signal of the chroma component block.

Meanwhile, when the residual signal is not present, the prediction signal may be set as the reconstructed signal.

Hereinafter, step of entropy-encoding/decoding information on intra block copy prediction encoding will be described.

The information on intra block copy prediction encoding may be entropy-encoded in a bitstream or may be entropy-decoded from the bitstream. Here, the information on intra block copy prediction encoding may include at least one of the following information.

cu_skip_flag indicating whether a skip mode is used merge_flag indicating whether a merge mode is used merge_idx (merge index) indicating a merge candidate, pred_mode_flag indicating whether a prediction mode is intra prediction pre_mode_ibc_flag indicating whether the prediction mode is inter prediction or intra block copy prediction block vector candidate index (mvp_l0_flag)

motion vector difference cu_cbf, tu_cbf_luma, tu_cbf_cb and tu_cbf_cr indicating presence/absence of the quantization transform coefficient of the residual signal Here, the cu_skip_flag may mean whether a skip mode is used and may be entropy-encoded in units of at least one of encoding blocks or prediction blocks. For example, if information indicating whether the skip mode is used has a first value of 1, this may indicate that the skip mode is used and, when information indicating whether the skip mode is used has a second value of 0, this may indicate that the skip mode is not used.

The merge_flag may mean whether the merge mode is used and may be entropy-encoded in units of at least one of encoding blocks or prediction blocks. For example, if information indicating whether the merge mode is used has a first value of 1, this may indicate that the merge mode is used and, when information indicating whether the skip mode is used has a second value of 0, this may indicate that the merge mode is not used.

The merge_idx may mean information indicating a merge candidate in a merge candidate list and may be entropy-encoded in units of at least one of encoding blocks or prediction blocks. In addition, merge_idx may mean merge index information. In addition, merge_idx may indicate a block, in which a merge candidate is derived, among blocks reconstructed spatially adjacent to the current block. In addition, merge_idx may indicate at least one of the motion information of the merge candidate. For example, the merge index information having a first value of 0 may indicate a first merge candidate in the merge candidate list, the merge index information having a second value of 1 may indicate a second merge candidate in the merge candidate list, and the merge index information having a third value of 2 may indicate a third merge candidate in the merge candidate list. In addition, the merge index information having fourth to N-th value may indicate merge candidates corresponding to the corresponding values in the order of candidates in the merge candidate list. Here, N may be a positive integer including 0.

The pred_mode_flag may mean whether an intra prediction mode is applied and may be entropy-encoded in units of at least one of encoding blocks or prediction blocks. For example, the information indicating whether the intra prediction mode is applied, which has a first value of 1, may indicate that the intra prediction mode is applied and the information indicating whether the intra prediction mode is applied, which has a second value of 0, may indicate that the intra prediction mode is not applied.

The pred_mode_ibc_flag may mean whether an intra block copy prediction mode is applied and may be entropy-encoded in units of at least one of encoding blocks, prediction blocks or encoding units. For example, the information indicating whether the intra block copy prediction mode is applied, which has a first value of 1, may indicate that the intra block copy prediction mode is applied and the information indicating whether the intra block copy prediction mode is applied, which has a second value of 0, may indicate that the intra block copy prediction mode is not applied.

The block vector candidate index mvp_l0_flag may indicate the block vector candidate used by the current block in the block vector candidate list of the intra block copy prediction mode and the block vector candidate index may be entropy-encoded/decoded. The prediction block of the current block may be derived using the block vector candidate index.

The motion vector difference may mean a difference between the block vector and a predicted block vector, and the prediction block of the current block may be derived using the block vector difference.

In cu_cbf, tu_cbf_luma, tu_cbf_cb and tu_cbf_cr indicating presence/absence of the quantization transform coefficient of the residual signal, cu_cbf may mean information on presence/absence of the quantization transform coefficient of the luma component block and the quantization transform coefficient of the chroma component block when the luma component and the chroma component has the same block partitioning structure, and may mean information on the quantization transform coefficient of the luma component block or the chroma component block when the luma component and the chroma component have independent block partitioning structures. The information indicating presence/absence of the quantization transform coefficient, which has a first value of 1, may mean that the quantization coefficient coefficients of the blocks are present and the information indicating presence/absence of the quantization transform coefficient, which has a second value of 0, may mean that the quantization coefficient coefficients of the blocks are not present. tu_cbf_luma may mean presence/absence of the quantization transform coefficient of the luma component block, and tu_cbf_cr and tu_cbf_cb may respectively mean presence/absence of the quantization transform coefficients of Cr and Cb of the chroma component. The information on presence/absence of the quantization transform coefficient of the luma component block, which has a first value of 1, may mean that the quantization transform coefficient of the luma block is present and the information on presence/absence of the quantization transform coefficient of the luma component block, which has a second value of 0, may mean that the quantization transform coefficient of the luma block is not present. The information on presence/absence of the quantization transform coefficient of the chroma components Cb or Cr, which has a first value of 1, may mean that the quantization transform coefficient of the chroma block is present and the information on presence/absence of the quantization transform coefficient of the chroma components Cb or Cr, which has a second value of 0, may mean that the quantization transform coefficient of the chroma block is not present.

In addition, at least one of information on intra block copy prediction encoding may be entropy-encoded/decoded from at least one of a video parameter set, a sequence parameter set, a picture parameter set, an adaptation parameter set, a tile header, a tile group header, a slice header or a slice payload.

FIGS. 24A, 24B, and 25 to 27 are views illustrating encoding information transmitted in association with intra block partitioning according to an embodiment of the present invention.

FIGS. 24A and 24B show an example of an encoding information transmission method for each block partitioning structure.

FIGS. 25 to 27 show an example of an encoding information transmission method of removing overlapping when cu_cbf and tu_cbf_luma information transmitted at the time of intra block partitioning prediction overlap.

In particular, FIGS. 25 to 27 show a method to remove redundant signaling of cu_cbf and tu_cbf_luma indicating the same information when there is an independent block partitioning structure and the luma component block is in intra block copy prediction. In addition, referring to FIGS. 25 to 27, in an independent block partitioning structure and when the luma component block is in intra block copy prediction, tu_cbf_luma may not be transmitted and the cu_cbf value may be set to the tu_cbf_luma value.

Referring to FIG. 25, in the case of the luma component block of the independent block partitioning structure (that is, treeType is DUAL_TREE_LUMA), by signaling tu_cbf_luma only when the prediction mode is an intra prediction mode (that is, CurPredMode[x0][y0]=MODE_INTRA), tu_cbf_luma may not be transmitted in the case where the luma component block of the independent block partitioning structure is in an intra block copy prediction mode. In addition, the luma component block of the independent block partitioning structure (that is, treeType is DUAL_TREE_LUMA), tu_cbf_cb and tu_cbf_cr may not be signaled and, when tu_cbf_cb and tu_cbf_cr are not signaled, these may be set to 0 in the decoding process. Meanwhile, the tu_cbf_luma value which is not signaled may be set to a cu_cbf value.

Referring to FIG. 26, in the case of the luma component block of the independent block partitioning structure (that is, treeType is DUAL_TREE_LUMA), by signaling tu_cbf_luma only when the prediction mode is not an intra block copy prediction mode (that is, CurPredMode[x0][y0]= MODE_IBC), tu_cbf_luma may not be transmitted when the luma component block of the independent block partitioning structure is in an intra block copy prediction mode. In addition, in the case of the luma component block of the independent block partitioning structure (that is, treeType is DUAL_TREE_LUMA), tu_cbf_cb and tu_cbf_cr may not be signaled and, when tu_cbf_cb and tu_cbf_cr are not signaled, these may be set to 0 in the decoding process. Meanwhile, the tu_cbf_luma value which is not signaled may be set to a cu_cbf value.

Referring to FIG. 27, in a structure in which tu_cbf_luma is signaled based on tu_cbf_cb and tu_cbf_cr, tu_cbf_luma may not be transmitted when the luma component block of the independent block partitioning structure is in an intra block copy prediction mode. In the case of the luma component block of the independent block partitioning structure (that is, treeType is DUAL_TREE_LUMA), tu_cbf_cb and tu_cbf_cr may not be signaled and, when tu_cbf_cb and tu_cbf_cr are not signaled, these may be set to 0 in the decoding process. In this case, tu_cbf_luma may not be signaled when both tu_cbf_cb and tu_cbf_cr are 0. At this time, the tu_cbf_luma value which is not signaled may be set to a cu_cbf value.

Meanwhile, referring to FIGS. 25 to 27, IntraSubPartitionsSplitType may indicate whether the corresponding block is partitioned into subblocks and is predicted at the time of applying intra prediction. When the luma component block is in an intra block copy prediction mode, the current block is not partitioned into subblocks and encoded. At this time, IntraSubPartitionsSplitType may correspond to ISP_NO_SPLIT. In addition, cu_sbt_flag indicates whether to perform transform in subblock units in the case of inter prediction and is not applicable when intra block copy prediction is applied. In the case of the intra block copy prediction mode, cu_sbt_flag may always have a value of 0.

When at least one of the information on motion compensation or region information is entropy-encoded, at least one of the following binarization methods may be used.

Truncated Rice binarization method
K-th order Exp_Golomb binarization method
Restricted K-th order Exp_Golomb binarization method
Fixed-length binarization method
Unary binarization method
Truncated Unary binarization method When at least one of the information on motion compensation or region information is entropy-encoded/decoded, a context model may be determined using at least one of information on motion compensation of a neighbor block, at least one of region information of a neighbor block, information on motion compensation encoded/decoded previously, region information encoded/decoded previously, information on a current unit/block depth or information on a current unit/block size.

When at least one of the information on motion compensation or region information is entropy-encoded/decoded, at least one of information on motion compensation of a neighbor block, entropy-encoding/decoding may be performed using at least one of region information of a neighbor block, information on motion compensation encoded/decoded previously, region information encoded/decoded previously, information on a current unit/block depth or information on a current unit/block size as the prediction value for information on motion compensation of the current block or the region information.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 only. For example, the above embodiments may be applied when a size of current block is 16×16 or smaller. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and structured for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
   determining whether an intra block copy mode is applied to a current block or not;
   in response to the intra block copy mode being applied to the current block, constructing a block vector candidate list for the current block,
   wherein the block vector candidate list is constructed by using a block vector buffer comprising multiple history based block vector candidates,
   wherein a history based block vector candidate stored in the block vector buffer is inserted into the block vector candidate list as a new block vector candidate, and
   wherein whether to insert the history based block vector candidate into the block vector candidate list or not is determined based on redundancy check between a block vector candidate in the block vector candidate list and the history based block vector candidate;
   obtaining a block vector of the current block based on one of block vector candidates included in the block vector candidate list; and
   obtaining prediction samples of the current block based on the block vector of the current block,
   wherein whether the block vector buffer is updated with the block vector of the current block or not is determined based on a size of the current block.

2. The method of claim 1, wherein the block vector buffer is initialized per a coding tree unit row.

3. The method of claim 1, wherein when both a width and a height of the current block are equal to or less than 4, the block vector buffer is not updated with the block vector of the current block.

4. The method of claim 1, wherein a prediction sample is obtained from an intra block copy buffer storing reconstruction samples reconstructed before the current block, and
   wherein a size of the intra block copy buffer is determined based on a size of a coding tree unit including the current block.

5. The method of claim 4, wherein the intra block copy buffer is initialized per a coding tree unit row.

6. The method of claim 1, wherein the method further comprises:
   determining whether to decode a coded block flag of the current block or not, the coded block flag indicating whether residual signal of a transform block for the current block is present in a bitstream or not,
   wherein in response to the current block being a dual tree luma block and the intra block copy mode being applied to the current block, decoding the coded block flag from the bitstream is omitted, and
   wherein in response to decoding the coded block flag being omitted, a value of the coded block flag is inferred to indicate that the residual signal of the transform block for the current block is present.

7. The method of claim 1, wherein in response to the current block being a dual tree luma block, whether the intra block copy mode is applied to the current block or not is determined based on prediction mode information explicitly signaled via a bitstream, and
   wherein in response to the current block being a dual tree chroma block, the prediction mode information is not decoded from the bitstream, and a value of the prediction mode information is implicitly determined at a decoder side.

8. A method of encoding an image, the method comprising:
   in response to an intra block copy mode being applied to a current block, constructing a block vector candidate list for the current block,
   wherein the block vector candidate list is constructed by using a block vector buffer comprising multiple history based block vector candidates,
   wherein a history based block vector candidate stored in the block vector buffer is inserted into the block vector candidate list as a new block vector candidate, and
   wherein whether to insert the history based block vector candidate into the block vector candidate list or not is determined based on redundancy check between a block vector candidate in the block vector candidate list and the history based block vector candidate;

obtaining a block vector of the current block;

obtaining prediction samples of the current block based on the block vector of the current block; and encoding index information specifying a block vector candidate, identical to the block vector of the current block, in the block vector candidate list, wherein whether the block vector buffer is updated with the block vector of the current block or is determined based on a size of the current block.

9. A device for transmitting compressed video data, comprising:

a process configured to obtain the compressed video data; and a transmitter configured to transmit the compressed video data, wherein obtaining the compressed video data comprises:

in response to an intra block copy mode being applied to the current block, constructing a block vector candidate list for the current block, wherein the block vector candidate list is constructed by using a block vector buffer comprising multiple history based block vector candidates, wherein a history based block vector candidate stored in the block vector buffer is inserted into the block vector candidate list as a new block vector candidate, and wherein whether to insert the history based block vector candidate into the block vector candidate list or not is determined based on a redundancy check between a block vector candidate in the block vector candidate list and the history based block vector candidate;

obtaining a block vector of the current block;

obtaining prediction samples of the current block based on the block vector of the current block; and encoding index information specifying a block vector candidate, identical to the block vector of the current block, in the block vector candidate list, wherein whether the block vector buffer is updated with the block vector of the current block or not is determined based on a size of the current block.

* * * * *